(12) United States Patent
Sasaki et al.

(10) Patent No.: US 10,797,350 B2
(45) Date of Patent: Oct. 6, 2020

(54) METHOD FOR PRODUCING SECONDARY BATTERY INCLUDING COATING ON ELECTRODE SURFACE

(71) Applicant: KABUSHIKI KAISHA TOYOTA JIDOSHOKKI, Aichi (JP)

(72) Inventors: Hiroyuki Sasaki, Kariya (JP); Tomoyuki Kawai, Kariya (JP); Yoshihiro Nakagaki, Kariya (JP); Hitoshi Aikiyo, Kariya (JP); Takeshi Maki, Kariya (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 252 days.

(21) Appl. No.: 15/765,905

(22) PCT Filed: Oct. 5, 2016

(86) PCT No.: PCT/JP2016/004473
§ 371 (c)(1),
(2) Date: Apr. 4, 2018

(87) PCT Pub. No.: WO2017/061107
PCT Pub. Date: Apr. 13, 2017

(65) Prior Publication Data
US 2018/0287208 A1    Oct. 4, 2018

(30) Foreign Application Priority Data

Oct. 5, 2015 (JP) ................................. 2015-197395
Oct. 5, 2015 (JP) ................................. 2015-197398

(51) Int. Cl.
*H01M 10/0569* (2010.01)
*H01M 4/587* (2010.01)
(Continued)

(52) U.S. Cl.
CPC ......... *H01M 10/0569* (2013.01); *H01M 4/13* (2013.01); *H01M 4/133* (2013.01);
(Continued)

(58) Field of Classification Search
CPC ......... H01M 10/0569; H01M 10/0567; H01M 10/0525
See application file for complete search history.

(56) References Cited

U.S. PATENT DOCUMENTS 8,986,881 B2    3/2015 Kako et al.
2015/0364794 A1* 12/2015 Nakazawa ........ H01M 10/0525
429/200

(Continued)

FOREIGN PATENT DOCUMENTS

CN    1412880 A    4/2003
CN    101335364 A    12/2008
(Continued)

OTHER PUBLICATIONS

International Search Report for PCT/JP2016/004473 dated Dec. 20, 2016 [PCT/ISA/210].
(Continued)

*Primary Examiner* — Olatunji A Godo
(74) *Attorney, Agent, or Firm* — Sughrue Mion, PLLC

(57) ABSTRACT

A method for producing a secondary battery including:
an electrolytic solution containing a metal salt whose cation is an alkali metal, an alkaline earth metal, or aluminum and whose anion has a chemical structure represented by general formula (1) below, and a linear carbonate represented by general formula (2) below;
a negative electrode;
a positive electrode; and
a coating on a surface of the negative electrode and/or the positive electrode, the coating containing S, O, and C,
(Continued)

the method including forming the coating by performing a specific activation process on a secondary battery including the electrolytic solution, the negative electrode, and the positive electrode, $(R^1X^1)(R^2SO_2)N$ general formula (1), $R^{20}OCOOR^{21}$ general formula (2).

25 Claims, 4 Drawing Sheets

(51) Int. Cl.
| | |
|---|---|
| H01M 10/0568 | (2010.01) |
| H01M 4/133 | (2010.01) |
| H01M 4/13 | (2010.01) |
| H01M 10/052 | (2010.01) |
| H01M 10/04 | (2006.01) |
| H01M 10/44 | (2006.01) |
| H01M 10/054 | (2010.01) |
| H01M 4/62 | (2006.01) |
| H01M 10/0525 | (2010.01) |
| H01M 10/058 | (2010.01) |
| H01M 4/02 | (2006.01) |

(52) U.S. Cl.
CPC .......... *H01M 4/587* (2013.01); *H01M 4/622* (2013.01); *H01M 10/049* (2013.01); *H01M 10/052* (2013.01); *H01M 10/054* (2013.01); *H01M 10/058* (2013.01); *H01M 10/0525* (2013.01); *H01M 10/0568* (2013.01); *H01M 10/446* (2013.01); *H01M 2004/021* (2013.01); *H01M 2004/027* (2013.01); *H01M 2300/0028* (2013.01); *H01M 2300/0037* (2013.01); *Y02T 10/7011* (2013.01)

(56) References Cited

U.S. PATENT DOCUMENTS

| | | |
|---|---|---|
| 2016/0226100 A1 | 8/2016 | Yamada et al. |
| 2017/0117582 A1 | 4/2017 | Mizuno et al. |
| 2017/0352920 A1 | 12/2017 | Kawai et al. |

FOREIGN PATENT DOCUMENTS

| | | | |
|---|---|---|---|
| JP | 2002-329529 A | | 11/2002 |
| JP | 2010-010078 A | | 1/2010 |
| JP | 2013-134922 A | | 7/2013 |
| JP | 2013-137873 A | | 7/2013 |
| JP | 2013-145724 A | | 7/2013 |
| JP | 2013-149477 A | | 8/2013 |
| JP | 2014-060119 A | | 4/2014 |
| JP | 2015-118745 A | | 6/2015 |
| WO | WO2014133107 | * | 9/2014 |
| WO | 2015/045387 A1 | | 4/2015 |
| WO | 2015/147110 A1 | | 10/2015 |
| WO | 2016/063468 A1 | | 4/2016 |

OTHER PUBLICATIONS

Office Action dated Mar. 20, 2020, from the China National Intellectual Property Administration in Application No. 201680058519.2.

* cited by examiner

METHOD FOR PRODUCING SECONDARY BATTERY INCLUDING COATING ON ELECTRODE SURFACE

CROSS REFERENCE TO RELATED APPLICATIONS

This application is a National Stage of International Application No. PCT/JP2016/004473 filed Oct. 5, 2016, claiming priority based on Japanese Patent Application Nos. 2015-197395 and 2015-197398 are filed Oct. 5, 2015, all of these listed applications are hereby incorporated by reference.

TECHNICAL FIELD

The present invention relates to a method for producing a secondary battery including a coating on an electrode surface.

BACKGROUND ART

Generally, a secondary battery such as a lithium ion secondary battery includes, as main components, a positive electrode, a negative electrode, and an electrolytic solution. In the electrolytic solution, an appropriate electrolyte is added at an appropriate concentration range. For example, in an electrolytic solution of a lithium ion secondary battery, a lithium salt such as $LiPF_6$ and $LiBF_4$ is commonly added as an electrolyte, and the concentration of the lithium salt in the electrolytic solution is generally set at about 1 mol/L.

In an organic solvent to be used in an electrolytic solution, a cyclic carbonate such as ethylene carbonate or propylene carbonate is generally mixed by not less than about 30 vol %, in order to suitably dissolve an electrolyte. The cyclic carbonate such as ethylene carbonate or propylene carbonate is considered to be degraded, by charging and discharging of the secondary battery, to form a coating called SEI (Solid Electrolyte Interphase) on the surface of a negative electrode.

Here, a general SEI coating on a negative electrode surface is considered to be present between the negative electrode surface and an electrolytic solution and inhibit further reductive degradation of the electrolytic solution. The presence of the SEI coating is considered to be essential particularly for a low potential negative electrode using a graphite or Si-based negative electrode active material.

If continuous degradation of the electrolytic solution is inhibited due to the presence of the SEI coating, the life of the secondary battery is considered to be extended. However, on the other hand, in a conventional secondary battery, the SEI coating on the negative electrode surface has not necessarily been considered to contribute to improvement in battery characteristics, since the SEI coating is a cause of resistance.

As an activation method or an initial charging method for a secondary battery, charging is generally performed at a slow rate of about 0.1 to 0.3C. The reason why the charging is performed at the slow rate is to sufficiently degrade a cyclic carbonate such as ethylene carbonate or propylene carbonate in order to form a SEI coating to a satisfactory degree.

Actually, Patent Literature 1 discloses a lithium ion secondary battery including an electrolytic solution that uses a mixed organic solvent containing ethylene carbonate by about 33 vol % and that contains $LiPF_6$ at a concentration of 1 mol/L (see EXAMPLES). Furthermore, Patent Literature 1 discloses a method for charging a lithium ion secondary battery having SEI formed therein by charging the lithium ion secondary battery disclosed in Patent Literature 1 at a rate of 0.3C or lower (see claim 1, paragraph [0083], and EXAMPLES).

Patent Literature 2 discloses a lithium ion secondary battery including an electrolytic solution that uses a mixed organic solvent containing ethylene carbonate and γ-butyrolactone at a volume ratio of 1:2 and that contains $LiBF_4$ at a concentration of 1.5 mol/L, and also states that the lithium ion secondary battery was produced through charging at 0.2C (see Example 1).

CITATION LIST

Patent Literature

Patent Literature 1: JP2014-60119 (A)
Patent Literature 2: JP2002-329529 (A)

SUMMARY OF INVENTION

Technical Problem

Requirements from the industry for secondary batteries have been diversified, and secondary batteries having various components have been provided in order to meet the requirements.

The present invention relates to a secondary battery including an electrolytic solution containing a specific metal salt and a specific organic solvent, and a purpose of the present invention is to provide a method for producing a secondary battery including a new coating equivalent to SEI.

Solution to Problem

The present inventor has conducted thorough investigation with many trials and errors for a secondary battery including an electrolytic solution containing a specific metal salt and a specific organic solvent. As a result, the present inventor has found that a specific coating is formed on the surface of an electrode by charging and discharging the secondary battery including the electrolytic solution containing the specific metal salt and the specific organic solvent. Furthermore, the present inventor has found that a coating is effectively formed by a specific charging and discharging method. On the basis of these findings, the present inventor has completed the present invention.

A method for producing a secondary battery of the present invention is a method for producing a secondary battery including:

an electrolytic solution containing a metal salt whose cation is an alkali metal, an alkaline earth metal, or aluminum and whose anion has a chemical structure represented by general formula (1) below, and a linear carbonate represented by general formula (2) below;

a negative electrode;

a positive electrode; and a coating on a surface of the negative electrode and/or the positive electrode, the coating containing S, O, and C, the method including forming the coating by performing, on a secondary battery including the electrolytic solution, the negative electrode, and the positive electrode, an activation process including step (a), step (b), and step (c) below, or step (a) and step (d) below.

(a) Step of performing charging to a second voltage $V_2$ in step (a-1) or step (a-2) below.

(a-1) Step of performing charging at a first rate $C_1$ to a first voltage $V_1$ and then performing charging at a second rate $C_2$ to the second voltage $V_2$ ($V_1<V_2$, $C_1<C_2$).

(a-2) Step of performing charging at a constant charging rate $C_{a-2}$ of 0.5C or higher to the second voltage $V_2$.

(b) Step of discharging the secondary battery having been subjected to step (a), at a third rate $C_3$ to a third voltage $V_3$ or lower.

(c) Step of performing charging and discharging at a fourth rate $C_4$ between the third voltage $V_3$ and the second voltage $V_2$.

(d) Step of keeping the temperature of the secondary battery in a range of 40 to 120° C.

$$(R^1X^1)(R^2SO_2)N \qquad \text{general formula (1)}$$

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^1$ and $R^2$ optionally bind with each other to form a ring.

$X^1$ is selected from $SO_2$, C=O, C=S, $R^aP$=O, $R^bP$=S, S=O, or Si=O.

$R^a$ and $R^b$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

$R^a$ and $R^b$ each optionally bind with $R^1$ or $R^2$ to form a ring.).

$$R^{20}OCOOR^{21} \qquad \text{general formula (2)}$$

($R^{20}$ and $R^{21}$ are each independently selected from $C_nH_aF_bCl_cBr_dI_e$ that is a linear alkyl, or $C_mH_fF_gCl_hBr_iI_j$ that includes a cyclic alkyl in the chemical structure thereof. "n" is an integer not smaller than 1, "m" is an integer not smaller than 3, and "a", "b", "c", "d", "e", "f", "g", "h", "i", and "j" are each independently an integer not smaller than 0, and satisfy $2n+1=a+b+c+d+e$ and $2m-1=f+g+h+i+j$).

Advantageous Effects of Invention

The secondary battery produced by the production method of the present invention has excellent battery characteristics.

DESCRIPTION OF EMBODIMENTS

Figure 1:
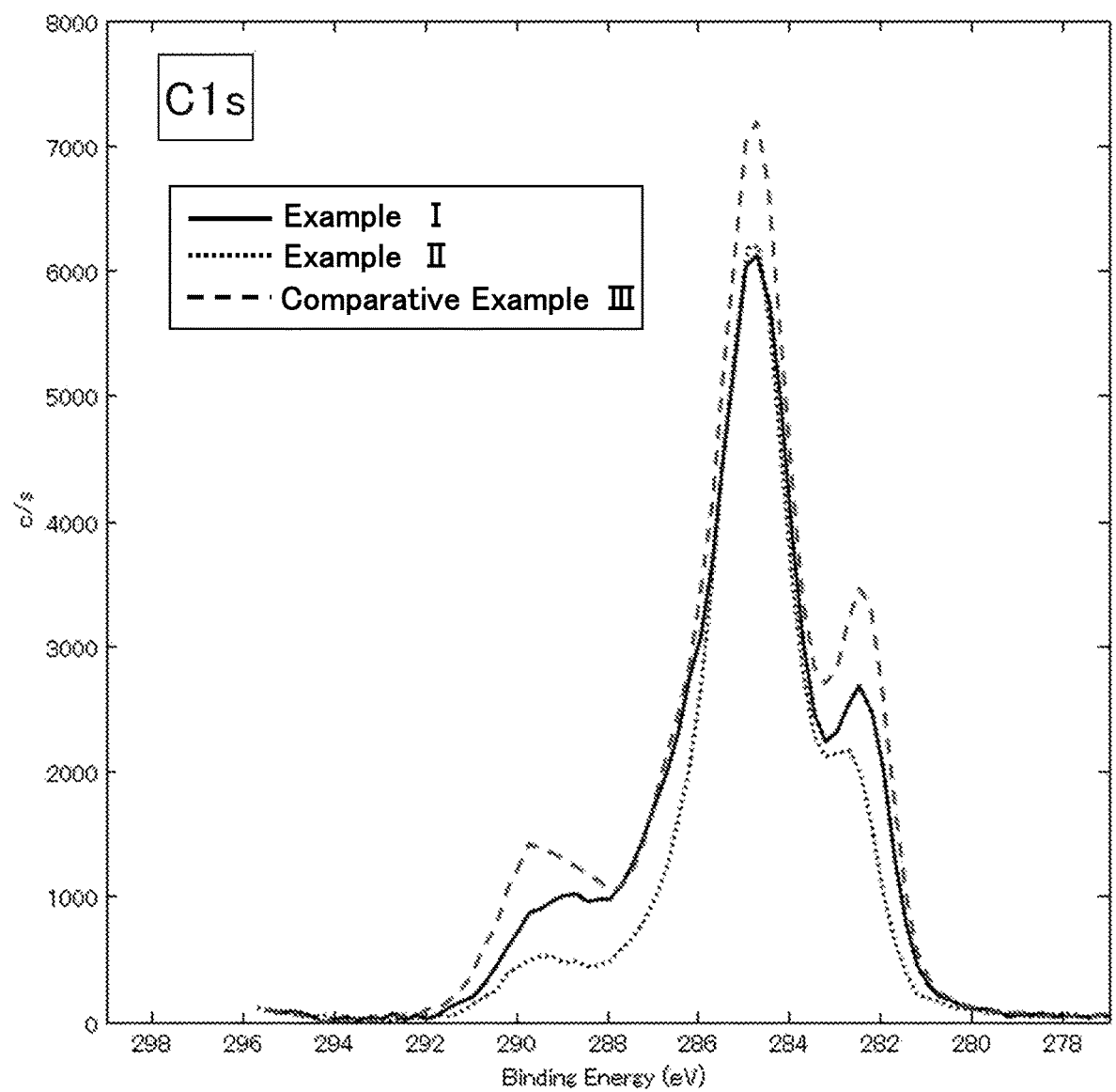
FIG. 1 is an X-ray photoelectron spectroscopy analysis chart regarding carbon element in lithium ion secondary batteries of Example I, Example II and Comparative Example III in Evaluation Example II.

The following describes embodiments of the present invention. Unless mentioned otherwise in particular, a numerical value range of "a to b (or, a-b)" described in the present specification includes, in the range thereof, a lower limit "a" and an upper limit "b". A numerical value range is formed by arbitrarily combining such upper limit values, lower limit values, and numerical values described in Examples. In addition, numerical values arbitrarily selected within a numerical value range may be used as upper limit and lower limit numerical values.

A method for producing a secondary battery of the present invention (hereinafter, a secondary battery produced by the method for producing the secondary battery of the present invention is sometimes referred to as "secondary battery of the present invention") is a method for producing a secondary battery including:

an electrolytic solution containing a metal salt whose cation is an alkali metal, an alkaline earth metal, or aluminum and whose anion has a chemical structure represented by general formula (1) below, and a linear carbonate represented by general formula (2) below;

a negative electrode;

a positive electrode; and a coating on a surface of the negative electrode and/or the positive electrode, the coating containing S, O, and C, the method being characterized by forming the coating by performing, on a secondary battery including the electrolytic solution, the negative electrode, and the positive electrode, an activation process including step (a), step (b), and step (c) described below, or step (a) and step (d) described below.

(a) Step of performing charging to a second voltage $V_2$ in step (a-1) or step (a-2) below.

(a-1) Step of performing charging at a first rate $C_1$ to a first voltage $V_1$ and then performing charging at a second rate $C_2$ to the second voltage $V_2$ ($V_1<V_2$, $C_1<C_2$).

(a-2) Step of performing charging at a constant charging rate $C_{a-2}$ of 0.5C or higher to the second voltage $V_2$.

(b) Step of discharging the secondary battery having been subjected to step (a), at a third rate $C_3$ to a third voltage $V_3$ or lower.

(c) Step of performing charging and discharging at a fourth rate $C_4$ between the third voltage $V_3$ and the second voltage $V_2$.

(d) Step of keeping the temperature of the secondary battery in a range of 40 to 120° C.

$$(R^1X^1)(R^2SO_2)N \qquad \text{general formula (1)}$$

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^1$ and $R^2$ optionally bind with each other to form a ring.

$X^1$ is selected from $SO_2$, C=O, C=S, $R^aP$=O, $R^bP$=S, S=O, or Si=O.

$R^a$ and $R^b$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

$R^a$ and $R^b$ each optionally bind with $R^1$ or $R^2$ to form a ring.).

$$R^{20}OCOOR^{21} \qquad \text{general formula (2)}$$

($R^{20}$ and $R^{21}$ are each independently selected from $C_nH_aF_bCl_cBr_dI_e$ that is a linear alkyl, or $C_mH_fF_gCl_hBr_iI_j$ that includes a cyclic alkyl in the chemical structure thereof. "n" is an integer not smaller than 1, "m" is an integer not smaller than 3, and "a", "b", "c", "d", "e", "f", "g", "h", "i", and "j" are each independently an integer not smaller than 0, and satisfy $2n+1=a+b+c+d+e$ and $2m-1=f+g+h+i+j$).

First, the electrolytic solution is described.

Examples of the cation of the metal salt contained in the electrolytic solution include alkali metals such as lithium, sodium, and potassium, alkaline earth metals such as beryllium, magnesium, calcium, strontium, and barium, and aluminum. The cation of the metal salt is preferably a metal ion identical to a charge carrier of the battery in which the electrolytic solution is used. For example, when the secondary battery of the present invention is used as a lithium ion secondary battery, the cation of the metal salt is preferably lithium.

The wording of "optionally substituted with a substituent group" in the chemical structures represented by the above described general formula (1) is to be described. For example, "an alkyl group optionally substituted with a substituent group" refers to an alkyl group in which one or more hydrogen atoms of the alkyl group is substituted with a substituent group, or an alkyl group not including any particular substituent groups.

Examples of the substituent group in the wording of "optionally substituted with a substituent group" include alkyl groups, alkenyl groups, alkynyl groups, cycloalkyl groups, unsaturated cycloalkyl groups, aromatic groups, heterocyclic groups, halogens, OH, SH, CN, SCN, OCN, nitro group, alkoxy groups, unsaturated alkoxy groups, amino group, alkylamino groups, dialkylamino groups, aryloxy groups, acyl groups, alkoxycarbonyl groups, acyloxy groups, aryloxycarbonyl groups, acylamino groups, alkoxycarbonylamino groups, aryloxycarbonylamino groups, sulfonylamino groups, sulfamoyl groups, carbamoyl group, alkylthio groups, arylthio groups, sulfonyl group, sulfinyl group, ureido groups, phosphoric acid amide groups, sulfo group, carboxyl group, hydroxamic acid groups, sulfino group, hydrazino group, imino group, and silyl group, etc. These substituent groups may be further substituted. In addition, when two or more substituent groups are present, the substituent groups may be identical or different from each other.

The chemical structure of the anion of the metal salt is preferably represented by general formula (1-1) below.

$$(R^3X^2)(R^4SO_2)N \qquad \text{general formula (1-1)}$$

($R^3$ and $R^4$ are each independently $C_nH_aF_bCl_cBr_dI_e$ $(CN)_f$ $(SCN)_g$ $(OCN)_h$.

"n", "a", "b", "C", "d", "e", "f", "g", and "h" are each independently an integer not smaller than 0, and satisfy $2n+1=a+b+c+d+e+f+g+h$.

$R^3$ and $R^4$ optionally bind with each other to form a ring, and, in that case, satisfy $2n=a+b+c+d+e+f+g+h$.

$X^2$ is selected from $SO_2$, C=O, C=S, $R^cP$=O, $R^dP$=S, S=O, or Si=O.

$R^c$ and $R^d$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

$R^c$ and $R^d$ each optionally bind with $R^3$ or $R^4$ to form a ring.)

In the chemical structure represented by the general formula (1-1), the meaning of the wording of "optionally substituted with a substituent group" is synonymous with that described for the general formula (1).

In the chemical structure represented by the general formula (1-1), "n" is preferably an integer from 0 to 6, more preferably an integer from 0 to 4, and particularly preferably an integer from 0 to 2. In the chemical structure represented by the general formula (1-1), when $R^3$ and $R^4$ each optionally bind with each other to form a ring, "n" is preferably an integer from 1 to 8, more preferably an integer from 1 to 7, and particularly preferably an integer from 1 to 3.

The chemical structure of the anion of the metal salt is further preferably represented by general formula (1-2) below.

$$(R^5SO_2)(R^6SO_2)N \qquad \text{general formula (1-2)}$$

($R^5$ and $R^6$ are each independently $C_nH_aF_bCl_cBr_dI_e$. "n", "a", "b", "c", "d", and "e" are each independently an integer not smaller than 0, and satisfy $2n+1=a+b+c+d+e$.

$R^5$ and $R^6$ optionally bind with each other to form a ring, and, in that case, satisfy $2n=a+b+c+d+e$.)

In the chemical structure represented by the general formula (1-2), "n" is preferably an integer from 0 to 6, more preferably an integer from 0 to 4, and particularly preferably an integer from 0 to 2. In the chemical structure represented by the general formula (1-2), when $R^5$ and $R^6$ each optionally bind with each other to form a ring, "n" is preferably an integer from 1 to 8, more preferably an integer from 1 to 7, and particularly preferably an integer from 1 to 3.

In addition, in the chemical structure represented by the general formula (1-2), those in which "a," "c," "d," and "e" are 0 are preferable.

The metal salt is particularly preferably $(CF_3SO_2)_2NLi$ (hereinafter, sometimes referred to as "LiTFSA"), $(FSO_2)_2NLi$ (hereinafter, sometimes referred to as "LiFSA"), $(C_2F_5SO_2)_2NLi$, $FSO_2(CF_3SO_2)NLi$, $(SO_2CF_2CF_2SO_2)NLi$, $(SO_2CF_2CF_2CF_2SO_2)NLi$, $FSO_2(CH_3SO_2)NLi$, $FSO_2(C_2F_5SO_2)NLi$, or $FSO_2(C_2H_5SO_2)NLi$.

As the metal salt, one that is obtained by combining appropriate numbers of a cation and an anion described above may be used. Regarding the metal salt, a single type may be used, or a combination of two or more types may be used.

The electrolytic solution may include another electrolyte usable in an electrolytic solution for secondary batteries, other than the metal salt described above. In the electrolytic solution, the metal salt is contained by preferably not less than 50 mass %, more preferably not less than 70 mass %, and further preferably not less than 90 mass %, relative to the entire electrolyte contained in the electrolytic solution.

In the linear carbonates represented by the general formula (2), "n" is preferably an integer from 1 to 6, more preferably an integer from 1 to 4, and particularly preferably an integer from 1 to 2. "m" is preferably an integer from 3 to 8, more preferably an integer from 4 to 7, and particularly preferably an integer from 5 to 6. In addition, either the linear alkyl or the cyclic alkyl in $R^{20}$ and $R^{21}$ of the general formula (2) preferably satisfies a>0 or f>0.

Among the linear carbonates represented by the general formula (2), those represented by the following general formula (2-1) are particularly preferable.

$$R^{22}OCOOR^{23} \qquad \text{general formula (2-1)}$$

($R^{22}$ and $R^{23}$ are each independently selected from $C_nH_aF_b$ that is a linear alkyl, or $C_mH_fF_g$ that includes a cyclic alkyl in the chemical structure thereof. "n" is an integer not smaller than 1, "m" is an integer not smaller than 3, and "a", "b", "f", and "g" are each independently an integer not smaller than 0, and satisfy $2n+1=a+b$ and $2m-1=f+g$.)

In the linear carbonates represented by the general formula (2-1), "n" is preferably an integer from 1 to 6, more preferably an integer from 1 to 4, and particularly preferably an integer from 1 to 2. "m" is preferably an integer from 3 to 8, more preferably an integer from 4 to 7, and particularly preferably an integer from 5 to 6.

Among the linear carbonates represented by the general formula (2-1), dimethyl carbonate (hereinafter, sometimes referred to as "DMC"), diethyl carbonate (hereinafter, sometimes referred to as "DEC"), ethyl methyl carbonate (hereinafter, sometimes referred to as "EMC"), fluoromethyl methyl carbonate, difluoromethyl methyl carbonate, trifluoromethyl methyl carbonate, bis(fluoromethyl)carbonate, bis(difluoromethyl)carbonate, bis(trifluoromethyl)carbonate, fluoromethyl difluoromethyl carbonate, 2,2,2-trifluoroethyl methyl carbonate, pentafluoroethyl methyl carbonate, ethyl trifluoromethyl carbonate, and bis(2,2,2-trifluoroethyl)carbonate are particularly preferable.

Regarding the linear carbonates described above, a single type may be used by itself in the electrolytic solution, or a combination of a plurality of types may be used.

The electrolytic solution may contain another organic solvent usable in an electrolytic solution for secondary batteries, other than the linear carbonate. In the electrolytic solution, the linear carbonate is contained, relative to the entire organic solvent contained in the electrolytic solution, by preferably not less than 80 vol %, more preferably not less than 90 vol %, and further preferably not less than 95 vol %. In addition, in the electrolytic solution, the linear carbonate is contained, relative to the entire organic solvent contained in the electrolytic solution, by preferably not less than 80 mole %, more preferably not less than 90 mole %, and further preferably not less than 95 mole %.

In some cases, the electrolytic solution containing another organic solvent other than the linear carbonate has an increased viscosity or a reduced ionic conductivity compared to the electrolytic solution not containing another organic solvent. Furthermore, in some cases, a secondary battery using the electrolytic solution containing another organic solvent other than the linear carbonate has an increased reaction resistance.

Specific examples of the other organic solvent include nitriles such as acetonitrile, propionitrile, acrylonitrile, and malononitrile, ethers such as 1,2-dimethoxyethane, 1,2-diethoxyethane, tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, and crown ethers, cyclic carbonates such as ethylene carbonate and propylene carbonate, amides such as formamide, N,N-dimethylformamide, N,N-dimethylacetamide, and N-methylpyrrolidone, isocyanates such as isopropyl isocyanate, n-propylisocyanate, and chloromethyl isocyanate, esters such as methyl acetate, ethyl acetate, propyl acetate, methyl propionate, methyl formate, ethyl formate, vinyl acetate, methyl acrylate, and methyl methacrylate, epoxies such as glycidyl methyl ether, epoxy butane, and 2-ethyloxirane, oxazoles such as oxazole, 2-ethyloxazole, oxazoline, and 2-methyl-2-oxazoline, ketones such as acetone, methyl ethyl ketone, and methyl isobutyl ketone, acid anhydrides such as acetic anhydride and propionic anhydride, sulfones such as dimethyl sulfone and sulfolane, sulfoxides such as dimethyl sulfoxide, nitros such as 1-nitropropane and 2-nitropropane, furans such as furan and furfural, cyclic esters such as γ-butyrolactone, γ-valerolactone, and δ-valerolactone, aromatic heterocycles such as thiophene and pyridine, heterocycles such as tetrahydro-4-pyrone, 1-methylpyrrolidine, and N-methylmorpholine, and phosphoric acid esters such as trimethyl phosphate and triethyl phosphate.

Examples of the other organic solvent also include hydrocarbon-based organic solvents such as benzene, toluene, ethyl benzene, o-xylene, m-xylene, p-xylene, 1-methylnaphthalene, hexane, heptane, and cyclohexane.

In addition, to the electrolytic solution, a fire-resistant solvent may be added. By adding the fire-resistant solvent to the electrolytic solution, safety of the electrolytic solution is further enhanced. Examples of the fire-resistant solvent include halogen based solvents such as carbon tetrachloride, tetrachloroethane, and hydrofluoroether, and phosphoric acid derivatives such as trimethyl phosphate and triethyl phosphate.

When the electrolytic solution is mixed with a polymer or an inorganic filler to form a mixture, the mixture enables containment of the electrolytic solution to provide a pseudo solid electrolyte. By using the pseudo solid electrolyte as an electrolytic solution of a battery, leakage of the electrolytic solution in the battery is suppressed.

As the polymer, a polymer used in batteries such as lithium ion secondary batteries and a general chemically cross-linked polymer are used. In particular, a polymer capable of turning into a gel by absorbing an electrolytic solution, such as polyvinylidene fluoride and polyhexafluoropropylene, and one obtained by introducing an ion conductive group to a polymer such as polyethylene oxide are suitable.

Specific examples of the polymer include polymethyl acrylate, polymethyl methacrylate, polyethylene oxide, polypropylene oxide, polyacrylonitrile, polyvinylidene fluoride, polyethylene glycol dimethacrylate, polyethylene glycol acrylate, polyglycidol, polytetrafluoroethylene, polyhexafluoropropylene, polysiloxane, polyvinyl acetate, polyvinyl alcohol, polyacrylic acid, polymethacrylic acid, polyitaconic acid, polyfumaric acid, polycrotonic acid, polyangelic acid, polycarboxylic acid such as carboxymethyl cellulose, styrene-butadiene rubbers, nitrile-butadiene rubbers, polystyrene, polycarbonate, unsaturated polyester obtained through copolymerization of maleic anhydride and glycols, polyethylene oxide derivatives having a substituent group, and a copolymer of vinylidene fluoride and hexafluoropropylene. In addition, as the polymer, a copolymer obtained through copolymerization of two or more types of monomers forming the above described specific polymers may be selected.

Polysaccharides are also suitable as the polymer. Specific examples of the polysaccharides include glycogen, cellulose, chitin, agarose, carrageenan, heparin, hyaluronic acid, pectin, amylopectin, xyloglucan, and amylose. In addition, materials containing these polysaccharides may be used as the polymer, and examples of the materials include agar containing polysaccharides such as agarose.

As the inorganic filler, inorganic ceramics such as oxides and nitrides are preferable.

Inorganic ceramics have hydrophilic and hydrophobic functional groups on their surfaces. Thus, a conductive passage may form within the inorganic ceramics when the functional groups attract the electrolytic solution. Furthermore, the inorganic ceramics dispersed in the electrolytic solution form a network among the inorganic ceramics themselves due to the functional groups, and may serve as containment of the electrolytic solution. With such a function by the inorganic ceramics, leakage of the electrolytic solution in the battery is further suitably suppressed. In order to have the inorganic ceramics suitably exert the function described above, the inorganic ceramics having a particle shape are preferable, and those whose particle sizes are nm order are particularly preferable.

Examples of the types of the inorganic ceramics include common alumina, silica, titania, zirconia, and lithium phosphate. In addition, inorganic ceramics that have lithium conductivity themselves are preferable, and specific examples thereof include $Li_3N$, $LiI$, $LiI-Li_3N-LiOH$, $LiI-Li_2S-P_2O_5$, $LiI-Li_2S-P_2S_5$, $LiI-Li_2S-B_2S_3$, $Li_2O-B_2S_3$, $Li_2O-V_2O_3-SaO_2$, $Li_2O-B_2O_3-P_2O_5$, $Li_2O-B_2O_3-ZnO$, $Li_2O-Al_2O_3-TiO_2-SiO_2-P_2O_5$, $LiTi_2(PO_4)_3$, $Li-\beta Al_2O_3$, and $LiTaO_3$.

Glass ceramics may be used as the inorganic filler. Since glass ceramics enables containment of ionic liquids, the same effect is expected for the electrolytic solution. Examples of the glass ceramics include compounds represented by $xLi_2S-(1-x)P_2S_5$ ($0<x<1$), and those in which one portion of S in the compound is substituted with another element and those in which one portion of P in the compound is substituted with germanium.

Without departing from the gist of the present invention, a known additive may be added to the electrolytic solution. Examples of such a known additive include: cyclic carbonates including an unsaturated bond represented by vinylene carbonate (VC), vinylethylene carbonate (VEC), methyl vinylene carbonate (MVC), and ethyl vinylene carbonate (EVC); carbonate compounds represented by fluoro ethylene carbonate, trifluoro propylene carbonate, phenylethylene carbonate, and erythritane carbonate; carboxylic anhydrides represented by succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenyl succinic anhydride; lactones represented by γ-butyrolactone, γ-valerolactone, γ-caprolactone, δ-valerolactone, δ-caprolactone, and ε-caprolactone; cyclic ethers represented by 1,4-dioxane; sulfur-containing compounds represented by ethylene sulfite, 1,3-propanesultone, 1,4-butanesultone, methyl methanesulfonate, busulfan, sulfolane, sulfolene, dimethyl sulfone, and tetramethylthiuram monosulfide; nitrogen-containing compounds represented by 1-methyl-2-pyrrolidinone, 1-methyl-2-piperidone, 3-methyl-2-oxazolidinone, 1,3-dimethyl-2-imidazolidinone, and N-methylsuccinimide; phosphates represented by monofluorophosphate and difluorophosphate; saturated hydrocarbon compounds represented by heptane, octane, and cycloheptane; and unsaturated hydrocarbon compounds represented by biphenyl, alkyl biphenyl, terphenyl, partially hydrogenated terphenyl, cyclohexylbenzene, t-butylbenzene, t-amyl benzene, diphenyl ether, and dibenzofuran.

The reason why the coating of the secondary battery of the present invention contains S, O, and C is considered to be that the metal salt and the linear carbonate contained in the electrolytic solution degrade and form the coating on the electrode surface. In the secondary battery of the present invention, even when the electrolytic solution does not contain a cyclic carbonate such as ethylene carbonate, a coating equivalent to an SEI coating is formed.

In the electrolytic solution, the mole ratio of the linear carbonate relative to the metal salt is preferably in a range of 1 to 8, more preferably in a range of 2 to 6, further preferably in a range of 3 to 5.5, particularly preferably in a range of 3.2 to 5, and most preferably in a range of 3.5 to 5.

In the electrolytic solution in which the mole ratio of the linear carbonate relative to the metal salt is in the range of 1 to 8, the cation and the anion of the metal salt are present closer to each other when compared to those in a general conventional electrolytic solution. Therefore, the anion is considered to be more likely to be reduced and degraded by being under strong electrostatic influence from the cation when compared to a conventional electrolytic solution. As a result, the electrolytic solution is considered to be advantageous in formation of the coating in the secondary battery of the present invention.

The secondary battery of the present invention includes, on the surface of the negative electrode and/or the positive electrode, a coating containing S, O, and C. S is inferred to be derived from the chemical structure represented by general formula (1) in the metal salt. O is inferred to be derived from the chemical structure represented by the general formula (1) in the metal salt and/or the linear carbonate represented by the general formula (2). C is inferred to be derived from the linear carbonate represented by the general formula (2).

Here, the mechanism for coating formation is considered. In view of resistance of the metal salt and the linear carbonate to oxidative and reductive degradation, a coating derived from a degradation product of the chemical structure represented by the general formula (1) in the metal salt is inferred to be initially formed, and a coating derived from the linear carbonate represented by the general formula (2) is inferred to be then formed.

The coating may be formed only on the negative electrode surface or may be formed only on the positive electrode surface. Preferably, the coating is formed on both the negative electrode surface and the positive electrode surface.

The coating may contain: a cation element such as Li; N; H; or a halogen such as F. Due to the coating containing the cation, the rate of transportation of the cation between the electrolytic solution and an active material interface via the coating is considered to be improved.

When the binding energy of elements contained in the coating is measured by using X-ray photoelectron spectroscopy, the coating is preferably observed to have at least one of the following peaks.

S: Peak having the peak top at 169±2 eV (hereafter, sometimes abbreviated as "169 eV peak")

S: Peak having the peak top at 160±2 eV (hereinafter, sometimes abbreviated as "160 eV peak")

O: Peak having the peak top at 532±2 eV (hereinafter, sometimes abbreviated as "532 eV peak")

O: Peak having the peak top at 528±1.5 eV (hereinafter, sometimes abbreviated as "528 eV peak")

C: Peak having the peak top at 290±1.5 eV (hereinafter, sometimes abbreviated as "290 eV peak")

C: Peak having the peak top at 285±1 eV (hereinafter, sometimes abbreviated as "285 eV peak")

C: Peak having the peak top at a value smaller by 1 to 4 eV than the peak having the peak top at 285±1 eV (hereinafter sometimes abbreviated as "283 eV peak")

The peak regarding the binding energy described above is inferred to be attributed to at least one of the following bonds.

S: 169 eV peak-→S-Ox bond (x is an integer from 1 to 4), S=O bond

S: 160 eV peak-→S—Li bond, Li—S—Li bond

O: 528 eV peak-→O—Li bond, Li—O—Li bond

C: 290 eV peak-→O—(C=O)—O bond, O—C=O bond, O—C—O bond

C: 285 eV peak-→C—H bond, C—C bond, C=C bond

Attributions of the respective peaks are also supported through quantum chemistry calculation. Actually, with respect to the attribution of carbon, when the molecular structure was optimized by using density functional theory and the level of is orbital of carbon was calculated, validity of attributions of the peaks described above were supported. As the quantum chemistry calculation program, Gaussian09 (registered trademark, Gaussian, Inc.) was used, the density functional was B3LYP, and the basis function was 6-311++ G(d,p) in which a polarization function and a dispersion function were added.

Among the above-described peaks, the 169 eV peak, the 160 eV peak, the 528 eV peak, and the 290 eV peak are derived from oxygen and sulfur that are capable of coordinating with lithium ions, or are derived from oxygen and carbon that are capable of coordinating with lithium ions. Therefore, the coating having relatively high intensities of the 169 eV peak, the 160 eV peak, the 528 eV peak, and the 290 eV peak is considered to be suitable for passage of lithium ions, which are a charge carrier, at a high speed. On the other hand, the 285 eV peak is considered to be a resistance factor when lithium ions pass through the coating.

From the above consideration and the results of evaluation examples described later, a coating that satisfies any one of relational expression 1 to relational expression 4 below is considered to allow lithium ions to pass therethrough at a high speed. Among the relational expression 1 to relational expression 4, a coating that satisfies two relational expressions is preferable, a coating that satisfies three relational expressions is more preferable, and a coating that satisfies all the four relational expressions is particularly preferable.

((intensity of 528 eV peak)/(intensity of 285 eV peak))≥0.18     Relational expression 1

(((intensity of 528 eV peak)+(intensity of 169 eV peak))/(intensity of 285 eV peak))≥0.21     Relational expression 2

(((intensity of 528 eV peak)+(intensity of 160 eV peak))/(intensity of 285 eV peak))≥0.19     Relational expression 3

(((intensity of 528 eV peak)+(intensity of 169 eV peak)+(intensity of 290 eV peak))/(intensity of 285 eV peak))≥0.33     Relational expression 4

Therefore, as a suitable mode of the secondary battery of the present invention, the following secondary battery is understood. The resistance during charging and discharging of the following secondary battery is considered to be relatively low.

A secondary battery including:

an electrolytic solution containing a metal salt whose cation is an alkali metal, an alkaline earth metal, or aluminum and whose anion has a chemical structure represented by the above general formula (1), and a linear carbonate represented by the above general formula (2);

a negative electrode;

a positive electrode; and a coating on a surface of the negative electrode and/or the positive electrode, the coating containing S, O, and C, the secondary battery being characterized in that when the binding energy of the elements contained in the coating is measured by using X-ray photoelectron spectroscopy, a 528 eV peak, a 285 eV peak, a 169 eV peak, a 160 eV peak, or a 290 eV peak is observed, and a relationship among the intensities of these peaks satisfies any one of the relational expression 1 to relational expression 4.

Regarding the relational expression 1, the relationship between the 528 eV peak and the 285 eV peak preferably satisfies relational expression 1-1 below and more preferably satisfies relational expression 1-2 below.

((intensity of 528 eV peak)/(intensity of 285 eV peak))≥0.20   Relational expression 1-1

((intensity of 528 eV peak)/(intensity of 285 eV peak))≥0.25   Relational expression 1-2

If an upper limit of ((intensity of 528 eV peak)/(intensity of 285 eV peak)) in the relational expression 1, the relational expression 1-1, and the relational expression 1-2 is to be shown, examples thereof include 0.50, 1.00, and 2.00.

Regarding the relational expression 2, the relationship among the 528 eV peak, the 285 eV peak, and the 169 eV peak preferably satisfies relational expression 2-1 below and more preferably satisfies relational expression 2-2 below.

(((intensity of 528 eV peak)+(intensity of 169 eV peak))/(intensity of 285 eV peak))≥0.3   Relational expression 2-1

(((intensity of 528 eV peak)+(intensity of 169 eV peak))/(intensity of 285 eV peak))≥0.4   Relational expression 2-2

If an upper limit of (((intensity of 528 eV peak)+(intensity of 169 eV peak))/(intensity of 285 eV peak)) in the relational expression 2, the relational expression 2-1, and the relational expression 2-2 is to be shown, examples thereof include 0.70, 0.90, and 2.00.

Regarding the relational expression 3, the relationship among the 528 eV peak, the 285 eV peak, and the 160 eV peak preferably satisfies relational expression 3-1 below and more preferably satisfies relational expression 3-2 below.

(((intensity of 528 eV peak)+(intensity of 160 eV peak))/(intensity of 285 eV peak))≥0.25   Relational expression 3-1

(((intensity of 528 eV peak)+(intensity of 160 eV peak))/(intensity of 285 eV peak))≥0.3   Relational expression 3-2

If an upper limit of (((intensity of 528 eV peak)+(intensity of 160 eV peak))/(intensity of 285 eV peak)) in the relational expression 3, the relational expression 3-1, and the relational expression 3-2 is to be shown, examples thereof include 0.60, 0.80, and 2.00.

Regarding the relational expression 4, the relationship among the 528 eV peak, the 285 eV peak, the 169 eV peak, and the 290 eV peak preferably satisfies relational expression 4-1 below and more preferably satisfies relational expression 4-2 below.

(((intensity of 528 eV peak)+(intensity of 169 eV peak)+(intensity of 290 eV peak))/(intensity of 285 eV peak))≥0.38   Relational expression 4-1

(((intensity of 528 eV peak)+(intensity of 169 eV peak)+(intensity of 290 eV peak))/(intensity of 285 eV peak))≥0.43   Relational expression 4-2

If an upper limit of (((intensity of 528 eV peak)+(intensity of 169 eV peak)+(intensity of 290 eV peak))/(intensity of 285 eV peak)) in the relational expression 4, the relational expression 4-1, and the relational expression 4-2 is to be shown, examples thereof include 0.55, 0.70, and 1.00.

The coating of the secondary battery of the present invention particularly preferably satisfies all relationships 1) to 4) below.

1) Relational expression 1, relational expression 1-1, or relational expression 1-2
2) Relational expression 2, relational expression 2-1, or relational expression 2-2
3) Relational expression 3, relational expression 3-1, or relational expression 3-2
4) Relational expression 4, relational expression 4-1, or relational expression 4-2

For the coating of the secondary battery of the present invention, the following peaks other than the above-described peaks may be observed when the binding energy of the elements contained in the coating by using X-ray photoelectron spectroscopy is measured.

O: Peak having a peak top at 532±2 eV (hereinafter, sometimes abbreviated as "532 eV peak")

C: Peak having a peak top at a value smaller by 1 to 4 eV than the 285 eV peak (hereinafter, sometimes abbreviated as "283 eV peak").

The peak intensity in the present specification means the peak height from a baseline to the peak top, or the peak area.

As the element percentages of a cation element such as Li; C; N; O; a halogen such as F; and S in the coating, the following ranges are shown as examples. The percentages of the elements are values calculated from analysis results obtained through X-ray photoelectron spectroscopy.

Cation element: 10 to 30%, C: 20 to 55% (in which 0 to 10% or 0 to 5% is derived from the 283 eV peak), N: 0.5 to 5%, O: 20 to 50%, halogen: 0.5 to 5%, S: 0.5 to 5%

Examples of the suitable ranges of percentages of elements in the coating are shown below.

Cation element: 17 to 27%, C: 25 to 50% (in which 0 to 10% or 0 to 5% is derived from the 283 eV peak), N: 0.7 to 4.5%, O: 25 to 47%, halogen: 0.7 to 4.5%, S: 1 to 4.7%

Examples of the more suitable ranges of percentages of elements in the coating are shown below.

Cation element: 15 to 25%, C: 30 to 45% (in which 0 to 10% or 0 to 5% is derived from the 283 eV peak), N: 1 to 4%, O: 30 to 45%, halogen: 1 to 4%, S: 2 to 4.5%

In some cases, the state of the coating changes associated with charging and discharging. For example, the thickness of the coating and the proportion of elements in the coating reversibly change sometimes depending on the state of charging and discharging. Thus, a portion that is derived from the degradation product of the chemical structure represented by the general formula (1) in the metal salt as described above and is fixed in the coating, and a portion that reversibly increases and decreases associated with charging and discharging are considered to be present in the coating in the secondary battery of the present invention.

Since the coating is considered to be derived from the degradation product of the electrolytic solution, a large portion or the entirety of the coating is considered to be produced during and after the first charging and discharging of the secondary battery. That is, the secondary battery of the present invention has the coating on the surface of the negative electrode and/or the surface of the positive electrode when being used. Components of the coating are considered to be sometimes different depending on the composition of the electrode and the components contained in the electrolytic solution.

Since deterioration of the electrodes and the electrolytic solution is inhibited by the electrodes being coated due to the presence of the coating, the durability of the secondary battery of the present invention is considered to be improved. Furthermore, a suitable coating has a significantly favorable effect on resistance reduction and input-output improvement of the secondary battery of the present invention.

The matters specifying the present invention are described below with the lithium ion secondary battery of the present invention, which is one embodiment of the secondary battery of the present invention, as an example.

The lithium ion secondary battery of the present invention includes: a negative electrode having a negative electrode active material capable of occluding and releasing lithium ions; a positive electrode having a positive electrode active material capable of occluding and releasing lithium ions; an electrolytic solution using a lithium salt as a metal salt; and the above-described coating.

As the negative electrode active material, a material capable of occluding and releasing lithium ions is used. Thus, the material is not limited in particular as long as the material is an elemental substance, an alloy, or a compound capable of occluding and releasing lithium ions. For example, an elemental substance from among Li, group 14 elements such as carbon, silicon, germanium, and tin, group 13 elements such as aluminum and indium, group 12 elements such as zinc and cadmium, group 15 elements such as antimony and bismuth, alkaline earth metals such as magnesium and calcium, and group 11 elements such as silver and gold may be used as the negative electrode active material. When silicon or the like is used as the negative electrode active material, a high capacity active material is obtained since a single silicon atom reacts with multiple lithium atoms. However, a risk of occurrence of a problem regarding a significant expansion and contraction of volume associated with occlusion and release of lithium exists. Thus, in order to mitigate the risk, an alloy or a compound obtained by combining an elemental substance of silicon or the like with another element such as a transition metal is suitably used as the negative electrode active material. Specific examples of the alloy or the compound include tin-based materials such as Ag—Sn alloys, Cu—Sn alloys, and Co—Sn alloys, carbon based materials such as various graphites, silicon based materials such as $SiO_x$ ($0.3 \leq x \leq 1.6$) that undergoes disproportionation into the elemental substance silicon and silicon dioxide, and a complex obtained by combining a carbon basedmaterial with elemental substance silicon or a silicon based material. In addition, as the negative electrode active material, an oxide such as $Nb_2O_5$, $TiO_2$, $Li_4Ti_5O_{12}$, $WO_2$, $MoO_2$, and $Fe_2O_3$, or a nitride represented by $Li_{3-x}M_xN$ (M=Co, Ni, Cu) may be used. With regard to the negative electrode active material, one or more types described above may be used.

A more specific example of the negative electrode active material is a graphite whose G/D ratio is not lower than 3.5. The G/D ratio is the ratio of G-band and D-band peaks in a Raman spectrum. In the Raman spectrum of graphite, G-band is observed near 1590 $cm^{-1}$ and D-band is observed near 1350 $cm^{-1}$, as peaks, respectively. G-band is derived from a graphite structure and D-band is derived from defects. Thus, having a higher G/D ratio, which is the ratio of G-band and D-band, means the graphite has higher crystallinity with fewer defects. Hereinafter, a graphite whose G/D ratio is not lower than 3.5 is sometimes referred to as a high-crystallinity graphite, and a graphite whose G/D ratio is lower than 3.5 is sometimes referred to as a low-crystallinity graphite.

As such a high-crystallinity graphite, both natural graphites and artificial graphites may be used. When a classification method based on shape is used, flake-like graphites, spheroidal graphites, block-like graphite, earthy graphites, and the like may be used. In addition, coated graphites obtained by coating the surface of a graphite with a carbon material or the like may also be used.

Examples of specific negative electrode active materials include carbon materials whose crystallite size is not larger than 20 nm, and preferably not larger than 5 nm. A larger crystallite size means that the carbon material has atoms arranged periodically and precisely in accordance with a certain rule. On the other hand, a carbon material whose crystallite size is not larger than 20 nm is considered to have atoms being in a state of poor periodicity and poor preciseness in arrangement. For example, when the carbon material is a graphite, the crystallite size becomes not larger than 20 nm when the size of a graphite crystal is not larger than 20 nm or when atoms forming the graphite are arranged irregularly due to distortion, defects, and impurities, etc.

Representative carbon materials whose crystallite size is not larger than 20 nm include hardly graphitizable carbon, which is so-called hard carbon, and easily graphitizable carbon, which is so-called soft carbon.

In order to measure the crystallite size of the carbon material, an X-ray diffraction method using CuK-alpha radiation as an X-ray source may be used. With the X-ray diffraction method, the crystallite size is calculated using the following Scherrer's equation on the basis of a half width of a diffraction peak detected at a diffraction angle of $2\theta=20$ degrees to 30 degrees and the diffraction angle.

$$L = 0.94 \lambda / (\beta \cos \theta)$$

where
L: crystallite size
$\lambda$: incident X-ray wavelength (1.54 angstrom)
$\beta$: half width of peak (radian)
$\theta$: diffraction angle.

Specific examples of the negative electrode active material include materials containing silicon. A more specific example is $SiO_x$ ($0.3 \leq x \leq 1.6$) disproportionated into two phases of Si phase and silicon oxide phase. The Si phase in $SiO_x$ is capable of occluding and releasing lithium ions, and changes in volume associated with charging and discharging of the secondary battery. The silicon oxide phase changes less in volume associated with charging and discharging when compared to the Si phase. Thus, $SiO_x$ as the negative electrode active material achieves higher capacity because of the Si phase, and when the silicon oxide phase is included, suppresses change in volume of the entirety of the negative electrode active material. When "x" becomes smaller than a lower limit value, cycle characteristics of the secondary battery deteriorate since the change in volume during charging and discharging becomes too large due to the ratio of Si becoming excessive. On the other hand, if "x" becomes larger than an upper limit value, energy density is decreased due to the Si ratio being too small. The range of "x" is more preferably $0.5 \leq x \leq 1.5$, and further preferably $0.7 \leq x \leq 1.2$.

In $SiO_x$ described above, an alloying reaction between lithium and silicon in the Si phase is considered to occur during charging and discharging of the lithium ion secondary battery. This alloying reaction is considered to contribute to charging and discharging of the lithium ion secondary battery. Also in the negative electrode active material including tin described later, charging and discharging are considered to occur by an alloying reaction between tin and lithium.

Specific examples of the negative electrode active material include materials containing tin. More specific examples include Sn elemental substance, tin alloys such as Cu—Sn and Co—Sn, amorphous tin oxides, and tin silicon oxides.

Examples of the amorphous tin oxides include $SnB_{0.4}P_{0.6}O_{3.1}$, and examples of the tin silicon oxides include $SnSiO_3$.

The material containing silicon and the material containing tin described above are each preferably made into a composite with a carbon material to be used as the negative electrode active material. By using those materials as a composite, the structure particularly of silicon and/or tin is stabilized, and durability of the negative electrode is improved. Making a composite mentioned above may be performed by a known method. As the carbon material used in the composite, a graphite, a hard carbon, a soft carbon, etc. may be used. The graphite may be a natural graphite or an artificial graphite.

Specific examples of the negative electrode active material include lithium titanate having a spinel structure such as $Li_{4-x}Ti_{5+y}O_{12}$ ($-1 \leq x \leq 4$, $-1 \leq y \leq 1$) and lithium titanate having a ramsdellite structure such as $Li_2Ti_3O_7$.

Specific examples of the negative electrode active material include graphites having a value of long axis/short axis of 1 to 5, and preferably 1 to 3. Here, the long axis means the length of the longest portion of a graphite particle. The short axis means the longest length in directions perpendicular to the long axis. Spheroidal graphites and meso carbon micro beads correspond to the graphite. The spheroidal graphites mean carbon materials which are artificial graphite, natural graphite, easily graphitizable carbon, and hardly graphitizable carbon, for example, and which have spheroidal or substantially spheroidal shapes.

Spheroidal graphite is obtained by grinding graphite into flakes by means of an impact grinder having a relatively small crushing force and by compressing and spheroidizing the flakes. Examples of the impact grinder include a hammer mill and a pin mill. The above operation is preferably performed with the outer-circumference line speed of the hammer or the pin of the mill set at about 50 to 200 m/s. Supply and ejection of graphite with respect to such mills are preferably performed in association with a current of air or the like.

The graphite is preferably have a BET specific surface area in a range of 0.5 to 15 $m^2/g$, and more preferably in a range of 4 to 12 $m^2/g$. When the BET specific surface area is too large, side reaction between the graphite and the electrolytic solution is accelerated in some cases. When the BET specific surface area is too small, reaction resistance of the graphite becomes large in some cases.

The mean particle diameter of the graphite is preferably in a range of 2 to 30 μm, and more preferably in a range of 5 to 20 μm. The mean particle diameter means D50 measured by a general laser diffraction scattering type particle size distribution measuring device.

The negative electrode includes a current collector, and a negative electrode active material layer bound to the surface of the current collector.

The current collector refers to an electron conductor that is chemically inert for continuously sending a flow of current to the electrode during discharging or charging of the lithium ion secondary battery. Examples of the current collector include at least one selected from silver, copper, gold, aluminum, tungsten, cobalt, zinc, nickel, iron, platinum, tin, indium, titanium, ruthenium, tantalum, chromium, or molybdenum, and metal materials such as stainless steel. The current collector may be coated with a known protective layer. One obtained by treating the surface of the current collector with a known method may be used as the current collector.

The current collector takes forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, the thickness thereof is preferably in a range of 1 μm to 100 μm.

The negative electrode active material layer includes a negative electrode active material, and, if necessary, a binding agent and/or a conductive additive.

The binding agent serves to adhere the active material, the conductive additive, or the like, to the surface of the current collector.

As the binding agent, a known binding agent may be used such as a fluorine-containing resin such as polyvinylidene fluoride, polytetrafluoroethylene, or fluororubber, a thermoplastic resin such as polypropylene or polyethylene, an imide based resin such as polyimide or polyamide-imide, an alkoxysilyl group-containing resin, or a styrene-butadiene rubber.

In addition, a polymer having a hydrophilic group may be used as the binding agent. The secondary battery of the present invention provided with a polymer having a hydrophilic group as the binding agent more suitably maintains the capacity thereof. Examples of the hydrophilic group of the polymer having a hydrophilic group include carboxyl group, sulfo group, silanol group, amino group, hydroxyl group, and phosphoric acid based group such as phosphoric acid group. Among those described above, a polymer containing a carboxyl group in the molecule thereof, such as polyacrylic acid, carboxymethyl cellulose, and polymethacrylic acid, or a polymer containing a sulfo group such as poly(p-styrenesulfonic acid) is preferable.

A polymer containing a large number of carboxyl groups and/or sulfo groups, such as polyacrylic acid or a copolymer of acrylic acid and vinylsulfonic acid, is water soluble. The polymer containing the hydrophilic group is preferably a water soluble polymer, and is preferably a polymer containing multiple carboxyl groups and/or sulfo groups in a single molecule thereof in terms of the chemical structure.

A polymer containing a carboxyl group in the molecule thereof is produced through, for example, a method of polymerizing an acid monomer or a method of imparting a carboxyl group to a polymer. Examples of the acid monomer include acid monomers having one carboxyl group in respective molecules such as acrylic acid, methacrylic acid, vinylbenzoic acid, crotonic acid, pentenoic acid, angelic acid, and tiglic acid, and acid monomers having two or more carboxyl groups in respective molecules such as itaconic acid, mesaconic acid, citraconic acid, fumaric acid, maleic acid, 2-pentenedioic acid, methylenesuccinic acid, allylmalonic acid, isopropylidene succinic acid, 2,4-hexadienedioic acid, and acetylene dicarboxylic acid.

A copolymer obtained through polymerization of two or more types of acid monomers selected from the acid monomers described above may be used as the binding agent.

For example, as disclosed in JP2013065493 (A), a polymer that includes in the molecule thereof an acid anhydride group formed through condensation of carboxyl groups of a copolymer of acrylic acid and itaconic acid is also preferably used as the binding agent. Since the binding agent has a structure derived from a monomer with high acidity by having two or more carboxyl groups in a single molecule thereof, the binding agent is considered to easily trap the lithium ions and the like before a degradation reaction of the electrolytic solution occurs during charging. Furthermore, although the polymer has an increased acidity because the polymer has more carboxyl groups per monomer when compared to polyacrylic acid and polymethacrylic acid, the acidity is not increased too much because a certain amount of carboxyl groups have changed into acid anhydride groups. Therefore, the secondary battery having the negative electrode using the polymer as the binding agent has improved initial efficiency and improved input-output characteristics.

The blending ratio of the binding agent in the negative electrode active material layer in mass ratio is preferably negative electrode active material: binding agent=1:0.005 to 1:0.3. The reason is that when too little of the binding agent is contained, moldability of the electrode deteriorates, whereas too much of the binding agent is contained, energy density of the electrode becomes low.

The conductive additive is added for increasing conductivity of the electrode. Thus, the conductive additive is preferably added optionally when conductivity of the electrode is insufficient, and does not have to be added when conductivity of the electrode is sufficiently good. As the conductive additive, a fine electron conductor that is chemically inert may be used, and examples thereof include carbonaceous fine particles such as carbon black, graphite, acetylene black, Ketchen black (registered trademark), vapor grown carbon fiber (VGCF), and various metal particles. With regard to the conductive additive described above, a single type by itself, or a combination of two or more types may be added to the active material layer. The blending ratio of the conductive additive in the negative electrode active material layer in mass ratio is preferably negative electrode active material: conductive additive=1: 0.01 to 1:0.5. The reason is that when too little of the conductive additive is contained, efficient conducting paths are not formed, whereas when too much of the conductive additive is contained, moldability of the negative electrode active material layer deteriorates and energy density of the electrode becomes low.

The positive electrode used in the lithium ion secondary battery includes a positive electrode active material capable of occluding and releasing lithium ions. The positive electrode includes a current collector and a positive electrode active material layer bound to the surface of the current collector. The positive electrode active material layer includes a positive electrode active material, and, if necessary, a binding agent and/or a conductive additive. The current collector of the positive electrode is not limited in particular as long as the current collector is a metal capable of withstanding a voltage suited for the active material that is used. Examples of the current collector include at least one selected from silver, copper, gold, aluminum, tungsten, cobalt, zinc, nickel, iron, platinum, tin, indium, titanium, ruthenium, tantalum, chromium, and molybdenum, and metal materials such as stainless steel.

When the potential of the positive electrode is set to not lower than 4V using lithium as reference, aluminum is preferably used as the current collector.

Specifically, as the positive electrode current collector, one formed from aluminum or an aluminum alloy is preferably used. Here, aluminum refers to pure aluminum, and an aluminum whose purity is not less than 99.0% is referred to as pure aluminum. An alloy obtained by adding various elements to pure aluminum is referred to as an aluminum alloy. Examples of the aluminum alloy include those that are Al—Cu based, Al—Mn based, Al—Fe based, Al—Si based, Al—Mg based, Al—Mg—Si based, and Al—Zn—Mg based.

In addition, specific examples of aluminum or the aluminum alloy include A1000 series alloys (pure aluminum based) such as JIS A1085, A1N30, etc., A3000 series alloys (Al—Mn based) such as JIS A3003, A3004, etc., and A8000 series alloys (Al—Fe based) such as JIS A8079, A8021, etc.

The current collector may be coated with a known protective layer. One obtained by treating the surface of the current collector with a known method may be used as the current collector.

The current collector takes forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, the thickness thereof is preferably in a range of 1 μm to 100 μm.

As the binding agent and the conductive additive for the positive electrode, those described with respect to the negative electrode are used at similar blending ratios.

Examples of the positive electrode active material include layer compounds that are $Li_aNi_bCo_cMn_dD_eO_f$ ($0.2 \leq a \leq 1.2$; $b+c+d+e=1$; $0 \leq e<1$; D is at least one element selected from Li, Fe, Cr, Cu, Zn, Ca, Mg, S, Si, Na, K, Al, Zr, Ti, P, Ga, Ge, V, Mo, Nb, W, or La; $1.7 \leq f \leq 2.1$) and $Li_2MnO_3$. Additional examples of the positive electrode active material include metal oxides having a spinel structure such as $LiMn_2O_4$, a solid solution formed from a mixture of a metal oxide having a spinel structure and a layer compound, and polyanion based compounds represented by $LiMPO_4$, $LiMVO_4$, $Li_2MSiO_4$ (where "M" is selected from at least one of Co, Ni, Mn, or Fe), or the like. Further additional examples of the positive electrode active material include tavorite based compounds represented by $LiMPO_4F$ ("M" is a transition metal) such as $LiFePO_4F$ and borate based compounds represented by $LiMBO_3$ ("M" is a transition metal) such as $LiFeBO_3$. Any metal oxide used as the positive electrode active material may have a basic composition of the composition formulae described above, and those in which a metal element included in the basic composition is substituted with another metal element may also be used. In addition, as the positive electrode active material, one that does not contain a charge carrier (e.g., a lithium ion contributing to the charging and discharging) may also be used. For example, elemental substance sulfur (S), a compound that is a composite of sulfur and carbon, metal sulfides such as $TiS_2$, oxides such as $V_2O_5$ and $MnO_2$, polyaniline and anthraquinone and compounds containing such aromatics in the chemical structure, conjugate based materials such as conjugate diacetic acid based organic matters, and known other materials may be used. Furthermore, a compound having a stable radical such as nitroxide, nitronyl nitroxide, galvinoxyl, and phenoxyl may be used as the positive electrode active material. When a positive electrode active material not containing a charge carrier such as lithium is to be used, a charge carrier has to be added in advance to the positive electrode and/or the negative electrode using a known method. The charge carrier may be added in an ionic state, or may be added in a nonionic state such as a metal. For example, when the charge carrier is lithium, a lithium foil may be pasted to and integrated with the positive electrode and/or the negative electrode.

Specific examples of the positive electrode active material include $LiNi_{0.5}Co_{0.2}Mn_{0.3}O_2$, $LiNi_{1/3}CO_{1/3}Mn_{1/3}O_2$, $LiNi_{0.5}Mn_{0.5}O_2 LiNi_{0.75}Co_{0.1}Mn_{0.15}O_2$, $LiMnO_2$, $LiNiO_2$, and $LiCoO_2$ having a layered rock salt structure. Another specific example of the positive electrode active material is $Li_2MnO_3$—$LiCoO_2$.

Specific examples of the positive electrode active material include $Li_xA_yMn_{2-y}O_4$ having a spinel structure ("A" is selected from: at least one element selected from Ca, Mg, S, Si, Na, K, Al, P, Ga, or Ge, and at least one type of metal element selected from transition metal elements, $0<x\leq2.2$, $0\leq y\leq1$). More specific examples include $LiMn_2O_4$, and $LiNi_{0.5}Mn_{1.5}O_4$.

Specific examples of the positive electrode active material include $LiFePO_4$, $Li_2FeSiO_4$, $LiCoPO_4$, $Li_2CoPO_4$, $Li_2MnPO_4$, $Li_2MnSiO_4$, and $Li_2CoPO_4F$.

In order to form the active material layer on the surface of the current collector, the active material may be applied on the surface of the current collector using a known conventional method such as roll coating method, die coating method, dip coating method, doctor blade method, spray coating method, and curtain coating method. Specifically, an active material layer forming composition containing the active material and, if necessary, the binding agent and the conductive additive, is prepared, and, after adding a suitable solvent to this composition to obtain a paste, the paste is applied on the surface of the current collector and then dried. Examples of the solvent include N-methyl-2-pyrrolidone, methanol, methyl isobutyl ketone, and water. In order to increase electrode density, compression may be performed after drying.

A separator is used in the lithium ion secondary battery, if necessary. The separator is for separating the positive electrode and the negative electrode to allow passage of lithium ions while preventing short circuit due to a contact of both electrodes. As the separator, one that is known may be used. Examples of the separator include porous materials, nonwoven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure.

A specific method for producing the lithium ion secondary battery before coating formation is described.

An electrode assembly is formed from the positive electrode, the negative electrode, and, if necessary, the separator interposed therebetween. The electrode assembly may be a laminated type obtained by stacking the positive electrode, the separator, and the negative electrode, or a wound type obtained by winding the positive electrode, the separator, and the negative electrode. The lithium ion secondary battery is preferably formed by respectively connecting, using current collecting leads or the like, the positive electrode current collector to a positive electrode external connection terminal and the negative electrode current collector to a negative electrode external connection terminal, and then adding the electrolytic solution to the electrode assembly.

As described above, the secondary battery of the present invention is produced by performing a specific activation process on a secondary battery including a specific electrolytic solution. The method for producing the secondary battery of the present invention is understandable as an adjustment method or an activation method for the secondary battery of the present invention. In addition, without departing from the gist of the present invention, a current pause time or a voltage keeping time may be provided in each step or between steps in the specific activation process.

In step (a), either step (a-1) or step (a-2) is selected to charge the secondary battery to the second voltage $V_2$. Step (a) may be performed at an ordinary temperature (25° C.), or under a cooling condition or a heating condition. Step (a) is preferably performed under a constant temperature condition. The range of the second voltage $V_2$ is 3.5 to 6 V, preferably 3.6 to 5.5 V, more preferably 3.7 to 5 V, and further preferably 3.8 to 4.5 V, for example.

Step (a-1) is a step of performing charging at the first rate $C_1$ to the first voltage $V_1$, and then performing charging at the second rate $C_2$ to the second voltage $V_2$ ($V_1<V_2$, $C_1<C_2$). As the first voltage $V_1$, a voltage satisfying $0.5\times V_2<V_1<V_2$ is preferable, a voltage satisfying $0.6\times V_2<V_1<0.95\times V_2$ is more preferable, and a voltage satisfying $0.7\times V_2<V_1<0.9\times V_2$ is further preferable.

The relationship between the first rate $C_1$ and the second rate $C_2$ is $C_1<C_2$, and is preferably $C_1<0.7\times C_2$, more preferably $C_1<0.5\times C_2$, and further preferably $C_1<0.3\times C_2$. Specific examples of the first rate $C_1$ include 0.05C, 0.1C, and 0.2C. Specific examples of the second rate $C_2$ include 0.5C, 0.8C, and 1C. 1C means a current value required for fully charging or discharging the secondary battery in 1 hour with a constant current. 2C means a current value required for fully charging or discharging the secondary battery in 0.5 hours with a constant current.

Step (a-2) is a step of performing charging at a constant charging rate $C_{a-2}$ of 0.5C or greater to a second voltage $V_2$. The charging rate $C_{a-2}$ is preferably 1C or greater. Examples of the range of the charging rate $C_{a-2}$ include $0.5C\leq C_{a-2}15C$, $1C\leq C_{a-2}13C$, and $2C\leq C_{a-2}\leq11C$.

In each of step (a-1) and step (a-2), after charging to the second voltage $V_2$ has been performed, charging for keeping the voltage is preferably performed. Examples of the second voltage $V_2$ keeping period include 0.5 to 5 hours and 1 to 3 hours.

In the method for producing the secondary battery of the present invention, a charging and discharging step including step (b) and step (c) described below, or a process including step (d) described below is performed on the secondary battery having been subjected to step (a) described above.

(b) a step of performing discharging the secondary battery having been subjected to step (a), at the third rate $C_3$ to the third voltage $V_3$ or lower.

(c) a step of performing charging and discharging at the fourth rate $C_4$ between the third voltage $V_3$ and the second voltage $V_2$.

(d) a step of keeping the temperature of the secondary battery in a range of 40 to 120° C.

First, the charging and discharging step including step (b) and step (c) is described.

The discharge voltage in step (b) may be any voltage not greater than the third voltage $V_3$ in step (c), and examples of the range thereof include $0.8\times V_3$ to $V_3$.

Examples of the range of the third rate $C_3$ include $0.5C\leq C_3\leq10C$, $0.5C\leq C_3\leq6C$, $1C\leq C_3\leq6C$, $0.5C\leq C_3\leq3C$, and $1C\leq C_3\leq3C$.

Step (b) may be performed at an ordinary temperature (25° C.), or under a cooling condition or a heating condition. Step (b) is preferably performed under a constant temperature condition. After discharging in step (b) has been ended, charging for keeping the voltage is preferably performed. Examples of the keeping period include 0.5 to 5 hours and 1 to 3 hours.

As the third voltage $V_3$ in step (c), a voltage satisfying $0.5\times V_2<V_3<V_2$ is preferable, a voltage satisfying $0.6\times V_2<V_3<0.95\times V_2$ is more preferable, and a voltage satisfying $0.7\times V_2<V_3<0.90\times V_2$ is further preferable.

Examples of the range of the fourth rate $C_4$ in step (c) include $0.5C\leq C_4\leq10C$, $1C\leq C_4\leq6C$, and $1C\leq C_4\leq3C$. $C_3<C_4$ is preferable. When step (a) is step (a-1), the relationship among the first rate $C_1$, the second rate $C_2$, the third rate $C_3$, and the fourth rate $C_4$ preferably satisfies $C_1<C_2<C_3<C_4$.

The temperature in step (c) is preferably in a range of 40 to 120° C., and more preferably in a range of 50 to 100° C. Step (c) is preferably performed under a constant temperature condition. In addition, step (c) is preferably repeated. Examples of the number of times of the repetition include 5 to 50 times, and 20 to 40 times. After each charging and discharging in step (c), charging for keeping the voltage may be performed. Examples of the keeping period include 0.1 to 2 hours, and 0.2 to 1 hours.

Next, step (d) is described. In step (d), the temperature of the secondary battery may be kept in a range of 40 to 120° C. while keeping constant the voltage of the charged secondary battery having been subjected to step (a). Alternatively, the temperature of the secondary battery may be kept in a range of 40 to 120° C. without keeping constant (naturally occurring voltage) the voltage of the charged secondary battery having been subjected to step (a). Further, in step (d), after the voltage of the secondary battery is once adjusted to a specific value, the temperature of the secondary battery may be kept in a range of 40 to 120° C. An example of a more preferable temperature range for step (d) is 50 to 120° C., and an example of a further preferable temperature range for step (d) is 50 to 100° C.

Examples of the temperature keeping period in step (d) include 0.5 to 48 hours, 12 to 36 hours, and 18 to 30 hours. Step (d) may be performed on the secondary battery having been subjected to step (c).

Examples of the activation process for producing the secondary battery of the present invention including a suitable coating include an activation process including step (a-2), step (b), and step (c), or step (a-2) and step (d).

An activation process for a conventional general secondary battery is performed by: charging the secondary battery at 0.1C to the second voltage $V_2$, and then, discharging the secondary battery at 0.1C to the third voltage $V_3$; or charging the secondary battery at 0.1 mV/s to the second voltage $V_2$, and then discharging the secondary battery at 0.1 mV/s to the third voltage $V_3$. That is, the method for producing the secondary battery of the present invention is performed under a severer condition than that of the conventional activation process. In addition, due to the method for producing the secondary battery of the present invention, the secondary battery of the present invention exhibits significant effects such as reduction of the resistance during charging and discharging and increase of input and output of power.

Through the method for producing the secondary battery of the present invention, the following charging/discharging control device of the present invention is understood.

A charging/discharging control device of the present invention includes a control unit for performing, on the secondary battery, the above-described activation process including step (a), step (b), and step (c), or step (a) and step (d). The charging/discharging control device of the present invention may be installed in a production facility for the secondary battery, or may be installed in a charging system for charging the secondary battery before or after shipping of the secondary battery. The charging/discharging control device of the present invention, or the production facility or the charging system preferably includes a temperature control unit which controls the temperature of the secondary battery.

The form of the lithium ion secondary battery of the present invention is not limited in particular, and various forms such as a cylindrical type, a square type, a coin type, a laminated type, etc., are used.

The lithium ion secondary battery of the present invention may be mounted on a vehicle. The vehicle may be a vehicle that uses, as all or one portion of the source of power, electrical energy obtained from the lithium ion secondary battery, and examples thereof include electric vehicles and hybrid vehicles. When the lithium ion secondary battery is to be mounted on the vehicle, a plurality of the lithium ion secondary batteries may be connected in series to form an assembled battery. Other than the vehicles, examples of instruments on which the lithium ion secondary battery may be mounted include various home appliances, office instruments, and industrial instruments driven by a battery such as personal computers and portable communication devices. In addition, the lithium ion secondary battery of the present invention may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations for electric vehicles.

A capacitor of the present invention including the electrolytic solution may be formed by replacing, with active carbon or the like that is used as a polarized electrode material, a part or all of the negative electrode active material or the positive electrode active material, or apart or all of the negative electrode active material and the positive electrode active material, in the lithium ion secondary battery of the present invention described above. Examples of the capacitor of the present invention include electrical double layer capacitors and hybrid capacitors such as lithium ion capacitors. As the description of the capacitor of the present invention, the description of the lithium ion secondary battery of the present invention above in which "lithium ion secondary battery" is replaced by "capacitor" as appropriate is used.

Although embodiments of the present invention have been described above, the present invention is not limited to the embodiments. Without departing from the gist of the present invention, the present invention can be implemented in various modes with modifications and improvements, etc., that can be made by a person skilled in the art.

EXAMPLES

In the following, the present invention is described specifically by presenting Examples, etc. The present invention is not limited to these Examples.

Production Example 1-1

$(FSO_2)_2NLi$ serving as the metal salt was dissolved in dimethyl carbonate, whereby an electrolytic solution of Production Example 1-1 having $(FSO_2)_2NLi$ at a concentration of 3.0 mol/L was produced. In the electrolytic solution of Production Example 1-1, the organic solvent is contained at a mole ratio of 3 relative to the metal salt.

Production Example 1-2

$(FSO_2)_2NLi$ serving as the metal salt was dissolved in dimethyl carbonate, whereby an electrolytic solution of Production Example 1-2 having $(FSO_2)_2NLi$ at a concentration of 2.7 mol/L was produced. In the electrolytic solution of Production Example 1-2, the organic solvent is contained at a mole ratio of 3.5 relative to the metal salt.

Production Example 1-3

$(FSO_2)_2NLi$ serving as the metal salt was dissolved in dimethyl carbonate, whereby an electrolytic solution of Production Example 1-3 having $(FSO_2)_2NLi$ at a concentration of 2.3 mol/L was produced. In the electrolytic solution of Production Example 1-3, the organic solvent is contained at a mole ratio of 4 relative to the metal salt.

Production Example 1-4

$(FSO_2)_2NLi$ serving as the metal salt was dissolved in dimethyl carbonate, whereby an electrolytic solution of Production Example 1-4 having $(FSO_2)_2NLi$ at a concentration of 2.0 mol/L was produced. In the electrolytic solution of Production Example 1-4, the organic solvent is contained at a mole ratio of 5 relative to the metal salt.

Production Example 2-1

$(FSO_2)_2NLi$ serving as the metal salt was dissolved in a mixed solvent obtained by mixing dimethyl carbonate and diethyl carbonate at a mole ratio of 9:1, whereby an electrolytic solution of Production Example 2-1 having $(FSO_2)_2NLi$ at a concentration of 2.9 mol/L was produced. In the electrolytic solution of Production Example 2-1, the organic solvent is contained at a mole ratio of 3 relative to the metal salt.

Production Example 2-2

$(FSO_2)_2NLi$ serving as the metal salt was dissolved in a mixed solvent obtained by mixing dimethyl carbonate and diethyl carbonate at a mole ratio of 7:1, whereby an electrolytic solution of Production Example 2-2 having $(FSO_2)_2NLi$ at a concentration of 2.9 mol/L was produced. In the electrolytic solution of Production Example 2-2, the organic solvent is contained at a mole ratio of 3 relative to the metal salt.

Production Example 3

$(FSO_2)_2NLi$ serving as the metal salt was dissolved in a mixed solvent obtained by mixing dimethyl carbonate and propylene carbonate at a mole ratio of 7:1, whereby an electrolytic solution of Production Example 3 having $(FSO_2)_2NLi$ at a concentration of 3.0 mol/L was produced. In the electrolytic solution of Production Example 3, the organic solvent is contained at a mole ratio of 3 relative to the metal salt.

Production Example 4

$(FSO_2)_2NLi$ serving as the metal salt was dissolved in a mixed solvent obtained by mixing dimethyl carbonate and ethylene carbonate at a mole ratio of 7:1, whereby an electrolytic solution of Production Example 4 having $(FSO_2)_2NLi$ at a concentration of 3.0 mol/L was produced. In the electrolytic solution of Production Example 4, the organic solvent is contained at a mole ratio of 3.1 relative to the metal salt.

Production Example 5

$(FSO_2)_2NLi$ serving as the metal salt was dissolved in ethyl methyl carbonate, whereby an electrolytic solution of Production Example 5 having $(FSO_2)_2NLi$ at a concentration of 2.2 mol/L was produced. In the electrolytic solution of Production Example 5, the organic solvent is contained at a mole ratio of 3.5 relative to the metal salt.

Production Example 6

$(FSO_2)_2NLi$ serving as the metal salt was dissolved in diethyl carbonate, whereby an electrolytic solution of Production Example 6 having $(FSO_2)_2NLi$ at a concentration of 2.0 mol/L was produced. In the electrolytic solution of Production Example 6, the organic solvent is contained at a mole ratio of 3.5 relative to the metal salt.

Production Example 7-1

$(FSO_2)_2NLi$ serving as the metal salt was dissolved in a mixed solvent obtained by mixing dimethyl carbonate and ethyl methyl carbonate at a mole ratio of 9:1, whereby an electrolytic solution of Production Example 7-1 having $(FSO_2)_2NLi$ at a concentration of 2.9 mol/L was produced. In the electrolytic solution of Production Example 7-1, the organic solvent is contained at a mole ratio of 3 relative to the metal salt.

Production Example 7-2

$(FSO_2)_2NLi$ serving as the metal salt was dissolved in a mixed solvent obtained by mixing dimethyl carbonate and ethyl methyl carbonate at a mole ratio of 9:1, whereby an electrolytic solution of Production Example 7-2 having $(FSO_2)_2NLi$ at a concentration of 2.6 mol/L was produced. In the electrolytic solution of Production Example 7-2, the organic solvent is contained at a mole ratio of 3.6 relative to the metal salt.

Production Example 8-1

$(FSO_2)_2NLi$ was dissolved in a mixed solvent obtained by mixing dimethyl carbonate and ethyl methyl carbonate each serving as the linear carbonate at a mole ratio of 9:1, whereby an electrolytic solution of Production Example 8-1 containing $(FSO_2)_2NLi$ at a concentration of 2.4 mol/L was produced. In the electrolytic solution of Production Example 8-1, the linear carbonate is contained at a mole ratio of 4 relative to $(FSO_2)_2NLi$.

Production Example 8-2

Vinylene carbonate and $(FSO_2)_2NLi$ were dissolved in a mixed solvent obtained by mixing dimethyl carbonate and ethyl methyl carbonate each serving as the linear carbonate at a mole ratio of 9:1, whereby an electrolytic solution of Production Example 8-2 containing $(FSO_2)_2NLi$ at a concentration of 2.4 mol/L and vinylene carbonate by 0.13 mass % was produced. In the electrolytic solution of Production Example 8-2, the linear carbonate is contained at a mole ratio of 4 relative to $(FSO_2)_2NLi$. Vinylene carbonate is one type of known additives.

Production Example 8-3

An electrolytic solution of Production Example 8-3 was produced using a method similar to that in Production Example 8-2 except for increasing the added amount of vinylene carbonate such that vinylene carbonate is contained by 0.63 mass %.

Production Example 8-4

An electrolytic solution of Production Example 8-4 was produced using a method similar to that in Production Example 8-2 except for increasing the added amount of vinylene carbonate such that vinylene carbonate is contained by 1.0 mass %.

Production Example 8-5

An electrolytic solution of Production Example 8-5 was produced using a method similar to that in Production Example 8-2 except for increasing the added amount of vinylene carbonate such that vinylene carbonate is contained by 1.3 mass %.

Production Example 8-6

An electrolytic solution of Production Example 8-6 was produced using a method similar to that in Production Example 8-2 except for increasing the added amount of vinylene carbonate such that vinylene carbonate is contained by 2.5 mass %.

Production Example 8-7

An electrolytic solution of Production Example 8-7 was produced using a method similar to that in Production Example 8-2 except for increasing the added amount of vinylene carbonate such that vinylene carbonate is contained by 6.3 mass %.

Production Example 8-8

An electrolytic solution of Production Example 8-8 was produced using a method similar to that in Production Example 8-4 except for adding biphenyl such that biphenyl is contained by 0.5 mass %. Biphenyl is one type of known additives.

Production Example 8-9

An electrolytic solution of Production Example 8-9 was produced using a method similar to that in Production Example 8-4 except for adding biphenyl such that biphenyl is contained by 1.0 mass %.

Production Example 9-1

$(FSO_2)_2NLi$ serving as the metal salt was dissolved in a mixed solvent obtained by mixing dimethyl carbonate and ethyl methyl carbonate at a mole ratio of 9:1, whereby an electrolytic solution of Production Example 9-1 having $(FSO_2)_2NLi$ at a concentration of 2.0 mol/L was produced. In the electrolytic solution of Production Example 9-1, the organic solvent is contained at a mole ratio of 5 relative to the metal salt.

Production Example 9-2

$(FSO_2)_2NLi$ serving as the metal salt was dissolved in a mixed solvent obtained by mixing dimethyl carbonate and ethyl methyl carbonate at a mole ratio of 8:2, whereby an electrolytic solution of Production Example 9-2 having $(FSO_2)_2NLi$ at a concentration of 1.9 mol/L was produced. In the electrolytic solution of Production Example 9-2, the organic solvent is contained at a mole ratio of 5 relative to the metal salt.

Production Example 9-3

$(FSO_2)_2NLi$ serving as the metal salt was dissolved in a mixed solvent obtained by mixing dimethyl carbonate and ethyl methyl carbonate at a mole ratio of 7:3, whereby an electrolytic solution of Production Example 9-3 having $(FSO_2)_2NLi$ at a concentration of 1.9 mol/L was produced. In the electrolytic solution of Production Example 9-3, the organic solvent is contained at a mole ratio of 5 relative to the metal salt.

Production Example 10-1

$(FSO_2)_2NLi$ serving as the metal salt was dissolved in a mixed solvent obtained by mixing dimethyl carbonate and diethyl carbonate at a mole ratio of 9:1, whereby an electrolytic solution of Production Example 10-1 having $(FSO_2)_2NLi$ at a concentration of 1.9 mol/L was produced. In the electrolytic solution of Production Example 10-1, the organic solvent is contained at a mole ratio of 5 relative to the metal salt.

Production Example 10-2

$(FSO_2)_2NLi$ serving as the metal salt was dissolved in a mixed solvent obtained by mixing dimethyl carbonate and diethyl carbonate at a mole ratio of 8:2, whereby an electrolytic solution of Production Example 10-2 having $(FSO_2)_2NLi$ at a concentration of 1.9 mol/L was produced. In the electrolytic solution of Production Example 10-2, the organic solvent is contained at a mole ratio of 5 relative to the metal salt.

Production Example 10-3

$(FSO_2)_2NLi$ serving as the metal salt was dissolved in a mixed solvent obtained by mixing dimethyl carbonate and diethyl carbonate at a mole ratio of 7:3, whereby an electrolytic solution of Production Example 10-3 having $(FSO_2)_2NLi$ at a concentration of 1.8 mol/L was produced. In the electrolytic solution of Production Example 10-3, the organic solvent is contained at a mole ratio of 5 relative to the metal salt.

Comparative Production Example 1

$LiPF_6$ serving as the electrolyte was dissolved in a mixed solvent obtained by mixing dimethyl carbonate, ethyl methyl carbonate, and ethylene carbonate at a volume ratio of 4:3:3, whereby an electrolytic solution of Comparative Production Example 1 having $LiPF_6$ at a concentration of 1.0 mol/L was produced. In the electrolytic solution of Comparative Production Example 1, the organic solvent is contained at a mole ratio of 10 relative to the electrolyte.

Table 1-1 and Table 1-2 show the list of electrolytic solutions of Production Examples.

TABLE 1-1

| | Metal salt | Organic solvent | Number of moles of organic solvent/number of moles of metal salt | Concentration of metal salt (mol/L) |
|---|---|---|---|---|
| Production Example 1-1 | LiFSA | DMC | 3 | 3.0 |
| Production Example 1-2 | LiFSA | DMC | 3.5 | 2.7 |
| Production Example 1-3 | LiFSA | DMC | 4 | 2.3 |
| Production Example 1-4 | LiFSA | DMC | 5 | 2.0 |
| Production Example 2-1 | LiFSA | Mole ratio of DMC:DEC = 9:1 | 3 | 2.9 |
| Production Example 2-2 | LiFSA | Mole ratio of DMC:DEC = 7:1 | 3 | 2.9 |
| Production Example 3 | LiFSA | Mole ratio of DMC:PC = 7:1 | 3 | 3.0 |
| Production Example 4 | LiFSA | Mole ratio of DMC:EC = 7:1 | 3.1 | 3.0 |
| Production Example 5 | LiFSA | EMC | 3.5 | 2.2 |
| Production Example 6 | LiFSA | DEC | 3.5 | 2.0 |
| Production Example 7-1 | LiFSA | Mole ratio of DMC:EMC = 9:1 | 3 | 2.9 |
| Production Example 7-2 | LiFSA | Mole ratio of DMC:EMC = 9:1 | 3.6 | 2.6 |

TABLE 1-2

| | Metal salt | Organic solvent | Number of moles of organic solvent/number of moles of metal salt | Concentration of metal salt (mol/L) |
|---|---|---|---|---|
| Production Example 8-1 | LiFSA | Mole ratio of DMC:EMC = 9:1 | 4 | 2.4 |
| Production Example 8-2*) | LiFSA | Mole ratio of DMC:EMC = 9:1 | 4 | 2.4 |
| Production Example 8-3*) | LiFSA | Mole ratio of DMC:EMC = 9:1 | 4 | 2.4 |
| Production Example 8-4*) | LiFSA | Mole ratio of DMC:EMC = 9:1 | 4 | 2.4 |
| Production Example 8-5*) | LiFSA | Mole ratio of DMC:EMC = 9:1 | 4 | 2.4 |
| Production Example 8-6*) | LiFSA | Mole ratio of DMC:EMC = 9:1 | 4 | 2.4 |
| Production Example 8-7*) | LiFSA | Mole ratio of DMC:EMC = 9:1 | 4 | 2.4 |
| Production Example 8-8*) | LiFSA | Mole ratio of DMC:EMC = 9:1 | 4 | 2.4 |
| Production Example 8-9*) | LiFSA | Mole ratio of DMC:EMC = 9:1 | 4 | 2.4 |
| Production Example 9-1 | LiFSA | Mole ratio of DMC:EMC = 9:1 | 5 | 2.0 |
| Production Example 9-2 | LiFSA | Mole ratio of DMC:EMC = 8:2 | 5 | 1.9 |
| Production Example 9-3 | LiFSA | Mole ratio of DMC:EMC = 7:3 | 5 | 1.9 |
| Production Example 10-1 | LiFSA | Mole ratio of DMC:DEC = 9:1 | 5 | 1.9 |
| Production Example 10-2 | LiFSA | Mole ratio of DMC:DEC = 8:2 | 5 | 1.9 |
| Production Example 10-3 | LiFSA | Mole ratio of DMC:DEC = 7:3 | 5 | 1.8 |
| Comparative Production Example 1 | LiPF$_6$ | Volume ratio of DMC:EMC:EC = 4:3:3 | 10 | 1.0 |

*)In the electrolytic solution of Production Example 8-2, vinylene carbonate is contained by 0.13 mass %.
*)In the electrolytic solution of Production Example 8-3, vinylene carbonate is contained by 0.63 mass %.
*)In the electrolytic solution of Production Example 8-4, vinylene carbonate is contained by 1.0 mass %.
*)In the electrolytic solution of Production Example 8-5, vinylene carbonate is contained by 1.3 mass %.
*)In the electrolytic solution of Production Example 8-6, vinylene carbonate is contained by 2.5 mass %.
*)In the electrolytic solution of Production Example 8-7, vinylene carbonate is contained by 6.3 mass %.
*)In the electrolytic solution of Production Example 8-8, vinylene carbonate is contained by 1.0 mass %, and biphenyl is contained by 0.5 mass %.
*)In the electrolytic solution of Production Example 8-9, vinylene carbonate is contained by 1.0 mass %, and biphenyl is contained by 1.0 mass %.

The meanings of abbreviations in Table 1-1 and Table 1-2 are as follows.
LiFSA: $(FSO_2)_2NLi$
DMC: dimethyl carbonate
EMC: ethyl methyl carbonate
DEC: diethyl carbonate
PC: propylene carbonate
EC: ethylene carbonate Example I A lithium ion secondary battery of Example I including the electrolytic solution of Production Example 7-2 was produced in the following manner.

90 parts by mass of $Li_{1.1}Ni_{5/10}CO_{3/10}Mn_{2/10}O_2$ serving as the positive electrode active material, 8 parts by mass of acetylene black serving as the conductive additive, and 2 parts by mass of polyvinylidene fluoride serving as the binding agent were mixed. This mixture was dispersed in a proper amount of N-methyl-2-pyrrolidone to create a slurry. As the positive electrode current collector, an aluminum foil corresponding to JIS A1000 series and having a thickness of 15 μm was prepared. The slurry was applied in a film form on the surface of the aluminum foil by using a doctor blade. The aluminum foil on which the slurry was applied was dried for 20 minutes at 80° C. to remove N-methyl-2-pyrrolidone. Then, the aluminum foil was pressed to obtain a joined object. The obtained joined object was heated and dried in a vacuum dryer for 6 hours at 120° C. to obtain an aluminum foil having a positive electrode active material layer formed thereon. This was used as the positive electrode. The positive electrode active material layer was formed on the positive electrode current collector at 5.5 mg/cm$^2$ per unit area of the applied surface. The density of the positive electrode active material layer was 2.5 g/cm$^3$.

98 parts by mass of spheroidal graphite serving as the negative electrode active material, and 1 part by mass of styrene-butadiene-rubber and 1 part by mass of carboxymethyl cellulose, which both served as the binding agent, were mixed. This mixture was dispersed in a proper amount of ion exchanged water to create a slurry. As the negative electrode current collector, a copper foil having a thickness of 10 μm was prepared. The slurry was applied in a film form on the surface of the copper foil by using a doctor blade. The copper foil on which the slurry was applied was dried to remove water. Then, the copper foil was pressed to obtain a joined object. The obtained joined object was heated and dried in a vacuum dryer for 6 hours at 100° C. to obtain a copper foil having a negative electrode active material layer formed thereon. This was used as the negative electrode. The negative electrode active material layer was formed on the negative electrode current collector at 3.9 mg/cm² per unit area of the applied surface. The density of the negative electrode active material layer was 1.2 g/cm³.

As the separator, a porous film made from polypropylene and having a thickness of 20 µm was prepared.

An electrode assembly was formed by sandwiching the separator between the positive electrode and the negative electrode. The electrode assembly was covered with a set of two sheets of a laminate film. The laminate film was formed into a bag-like shape by having three sides thereof sealed, and the electrolytic solution of Production Example 7-2 was poured into the laminate film. Four sides were sealed airtight by sealing the remaining one side to obtain a lithium ion secondary battery in which the electrode assembly and the electrolytic solution were sealed.

The following activation process was performed on the obtained lithium ion secondary battery.

Step (a-2)

With respect to the lithium ion secondary battery, charging was performed up to a second voltage 4.1 V at 1C, and then the second voltage 4.10 V was kept for 1 hour at 25° C.

Step (b)

With respect to the lithium ion secondary battery having been subjected to step (a-2), discharging was performed down to 3 V at a third rate 1C, and then, the voltage 3 V was kept for 1 hour at 25° C.

Step (c)

With respect to the lithium ion secondary battery having been subjected to step (b), charging and discharging was performed at a fourth rate 2C at 60° C., between a third voltage 3.3 V and the second voltage 4.1 V. The lithium ion secondary battery for which the above charging and discharging had been repeated 29 times was used as the lithium ion secondary battery of Example I.

Example II

A lithium ion secondary battery of Example II was produced using a method similar to that in Example I except for setting the charging rate in step (a-2) to 5C.

Example III

A lithium ion secondary battery of Example III was produced using a method similar to that in Example I except for setting the charging rate in step (a-2) to 10C.

Example IV

A lithium ion secondary battery of Example IV was produced using a method similar to that in Example I except that the following step (a-1) was performed instead of step (a-2) and that the temperature in step (c) was set to 25° C.

Step (a-1)

With respect to the lithium ion secondary battery, charging was performed up to a first voltage 3.52 V at a first rate 0.1C, and then charging was performed up to a second voltage 4.10 V at a second rate 0.8C. Then, the second voltage 4.10 V was kept for 2.48 hours at 25° C.

Example V

A lithium ion secondary battery of Example V was produced using a method similar to that in Example IV except that the temperature in step (a-1) was set to 60° C., the temperature in step (b) was set to 60° C., and the temperature in step (c) was set to 60° C.

Example VI

A lithium ion secondary battery of Example VI was produced using a method similar to that in Example IV except for setting the temperature in step (c) to 60° C.

Example VII

A lithium ion secondary battery of Example VII was produced using a method similar to that in Example IV except that the following step (d) was performed instead of step (b) and step (c).

Step (d)

The lithium ion secondary battery having been subjected to step (a-1) was stored at naturally occurring voltage for 20 hours for 60° C.

Example VIII

A lithium ion secondary battery of Example VIII was produced using a method similar to that in Example II except that the following step (d) was performed instead of step (b) and step (c).

Step (d)

The lithium ion secondary battery having been subjected to step (a-2) was stored at naturally occurring voltage for 2 hours at 80° C.

Example IX

A lithium ion secondary battery of Example IX was produced using a method similar to that in Example I except that the following step (d) was performed after step (c).

Step (d)

With respect to the lithium ion secondary battery having been subjected to step (c), charging was performed up to 3.65 V at 25° C., and then, the lithium ion secondary battery was stored at naturally occurring voltage for 1 hour at 100° C.

Comparative Example I

A lithium ion secondary battery of Comparative Example I was produced using a method similar to that in Example I except that a general activation process 1 described below was performed as the activation process for the lithium ion secondary battery.

General Activation Process 1

With respect to the lithium ion secondary battery, charging was performed up to 4.10 V at 0.1C, and then, the voltage was kept for 1 hour for 25° C. Then, discharging was performed down to 3 V at 0.1C, and then, the voltage was kept for 1 hour at 25° C.

Comparative Example II

A lithium ion secondary battery of Comparative Example II was produced using a method similar to that in Example I except that a general activation process 2 described below was performed as the activation process for the lithium ion secondary battery.

General Activation Process 2

With respect to the lithium ion secondary battery, charging was performed up to 4.10 V at 0.1 mV/s, and then, the voltage was kept for 1 hour at 25° C. Then, discharging was performed down to 3 V at 0.1 mV/s, and then, the voltage was kept for 1 hour at 25° C.

Comparative Example III

A lithium ion secondary battery of Comparative Example III was produced using a method similar to that in Comparative Example I except for using the electrolytic solution of Comparative Production Example 1 as the electrolytic solution of the lithium ion secondary battery.

Comparative Example IV

A lithium ion secondary battery of Comparative Example IV was produced using a method similar to that in Example I except for using the electrolytic solution of Comparative Production Example 1 as the electrolytic solution of the lithium ion secondary battery.

Table 2 lists the lithium ion secondary batteries of Examples I to IX, and Table 3 lists the lithium ion secondary batteries of Comparative Examples I to IV.

TABLE 2

| | Electrolytic solution | Outline of activation process |
|---|---|---|
| Example I | Production Example 7-2 | (a-2) 1 C charging<br>(b) 1 C discharging<br>(c) 2 C charging and discharging, 29 cycles, 60° C. |
| Example II | Production Example 7-2 | (a-2) 5 C charging<br>(b) 1 C discharging<br>(c) 2 C charging and discharging, 29 cycles, 60° C. |
| Example III | Production Example 7-2 | (a-2) 10 C charging<br>(b) 1 C discharging<br>(c) 2 C charging and discharging, 29 cycles, 60° C. |
| Example IV | Production Example 7-2 | (a-1) 0.1 C→0.8 C charging<br>(b) 1 C discharging<br>(c) 2 C charging and discharging, 29 cycles, 25° C. |
| Example V | Production Example 7-2 | (a-1) 0.1 C→0.8 C charging, 60° C.<br>(b) 1 C discharging, 60° C.<br>(c) 2 C charging and discharging, 29 cycles, 60° C. |
| Example VI | Production Example 7-2 | (a-1) 0.1 C→0.8C charging<br>(b) 1 C discharging<br>(c) 2 C charging and discharging, 29 cycles, 60° C. |
| Example VII | Production Example 7-2 | (a-1) 0.1 C→0.8 C charging<br>(d) 60° C., 20 hours |
| Example VIII | Production Example 7-2 | (a-2) 5 C charging<br>(d) 80° C., 2 hours |
| Example IX | Production Example 7-2 | (a-2) 1 C charging<br>(b) 1 C discharging<br>(c) 2 C charging and discharging, 29 cycles, 60° C.<br>(d) 100° C., 1 hour |

TABLE 3

| | Electrolytic solution | Outline of activation process |
|---|---|---|
| Comparative Example I | Production Example 7-2 | 0.1 C charging, 0.1 C discharging |
| Comparative Example II | Production Example 7-2 | 0.1 mV/sec charging, 0.1 mV/sec discharging |
| Comparative Example III | Comparative Production Example 1 | 0.1 C charging, 0.1 C discharging |
| Comparative Example IV | Comparative Production Example 1 | (a-2) 1 C charging<br>(b) 1 C discharging<br>(c) 2 C charging and discharging, 29 cycles, 60° C. |

Evaluation Example I: Direct Current Resistance and Capacity Retention Rate

With respect to the lithium ion secondary batteries of Examples I to IX and Comparative Examples I to IV, the following test was performed to evaluate the direct current resistance and the capacity retention rate.

Further, for each of the lithium ion secondary batteries, the voltage was adjusted to 3.65 V with a constant current at 0.5C rate at a temperature of −10° C., and then, constant current charging was performed at 3C rate for 10 seconds. From the current value and the amount of change in voltage before and after this charging, the direct current resistance during charging was calculated according to Ohm's law.

Similarly, for each of the lithium ion secondary batteries, the voltage was adjusted to 3.65 V with a constant current at 0.5C rate at a temperature of −10° C., and then, constant current discharging was performed at 3C rate for 2 seconds. From the current value and the amount of change in voltage before and after this discharging, the direct current resistance during discharging was calculated according to Ohm's law.

For each of the lithium ion secondary batteries, a 4.1 V-3.0 V charging and discharging cycle of, with a constant current at 1C rate at a temperature of 60° C., charging up to 4.1 V and then discharging down to 3.0 V was performed by 200 cycles. The capacity retention rate (%) of each lithium ion secondary battery after 200 cycles was obtained by the following formula. Table 4 shows the results.

Capacity retention rate (%)=(B/A)×100

A: discharge capacity at first charging and discharging cycle
B: discharge capacity at 200-th cycle

TABLE 4

| | Direct current resistance during charging (Ω) | Direct current resistance during discharging (Ω) | Capacity retention rate (%) |
|---|---|---|---|
| Example I | 7.7 | 6.4 | 91 |
| Example II | 7.3 | 6.0 | 92 |
| Example III | 7.2 | 5.8 | 91 |
| Example IV | 10.7 | 9.3 | 91 |
| Example V | 9.0 | 7.6 | 91 |
| Example VI | 8.4 | 7.2 | 91 |
| Example VII | 8.3 | 7.0 | 91 |
| Example VIII | 7.5 | 6.3 | 91 |
| Example IX | 7.4 | 6.2 | 91 |
| Comparative Example I | 14.7 | 12.9 | 91 |
| Comparative Example II | 16.2 | 14.2 | 91 |
| Comparative Example III | 12.0 | 11.2 | 86 |

TABLE 4-continued

| | Direct current resistance during charging (Ω) | Direct current resistance during discharging (Ω) | Capacity retention rate (%) |
|---|---|---|---|
| Comparative Example IV | 8.3 | 7.4 | 85 |

From the results in Table 4, the lithium ion secondary batteries of Examples I to IX in which the activation process according to the method for producing the secondary battery of the present invention was performed on the lithium ion secondary battery is understood to be more excellent in reduction of the resistance during charging and discharging, than the lithium ion secondary batteries of Comparative Examples I to Comparative Example III in which a general activation process was performed on the lithium ion secondary battery.

From the results of the lithium ion secondary batteries of Example I and Comparative Example IV in which the same activation process was performed, the lithium ion secondary battery of Example I including the specific electrolytic solution is understood to be more excellent in both reduction of the resistance during charging and discharging and capacity retention rate.

From the above results, the method for producing the secondary battery of the present invention is considered to provide a secondary battery having suitable battery characteristics by performing the specific activation process on a secondary battery including the specific electrolytic solution.

Evaluation Example II: Analysis of Coating of Electrode

The lithium ion secondary batteries of Example I, Example II, Example IV, Example VI, Comparative Example III, and Comparative Example IV were each discharged down to 3 V. Then, each secondary battery was disassembled, and the negative electrode was taken out. Each negative electrode was washed by performing operation of immersing the negative electrode in dimethyl carbonate for 10 minutes three times, then dried, and used as the analysis target negative electrode. All steps from disassembling each lithium ion secondary battery to transporting each analysis target negative electrode to an analyzer were performed in an Ar gas atmosphere. Coating of each analysis target negative electrode surface was analyzed under the following condition by using an X-ray photoelectron spectroscopy.

Figure 2:
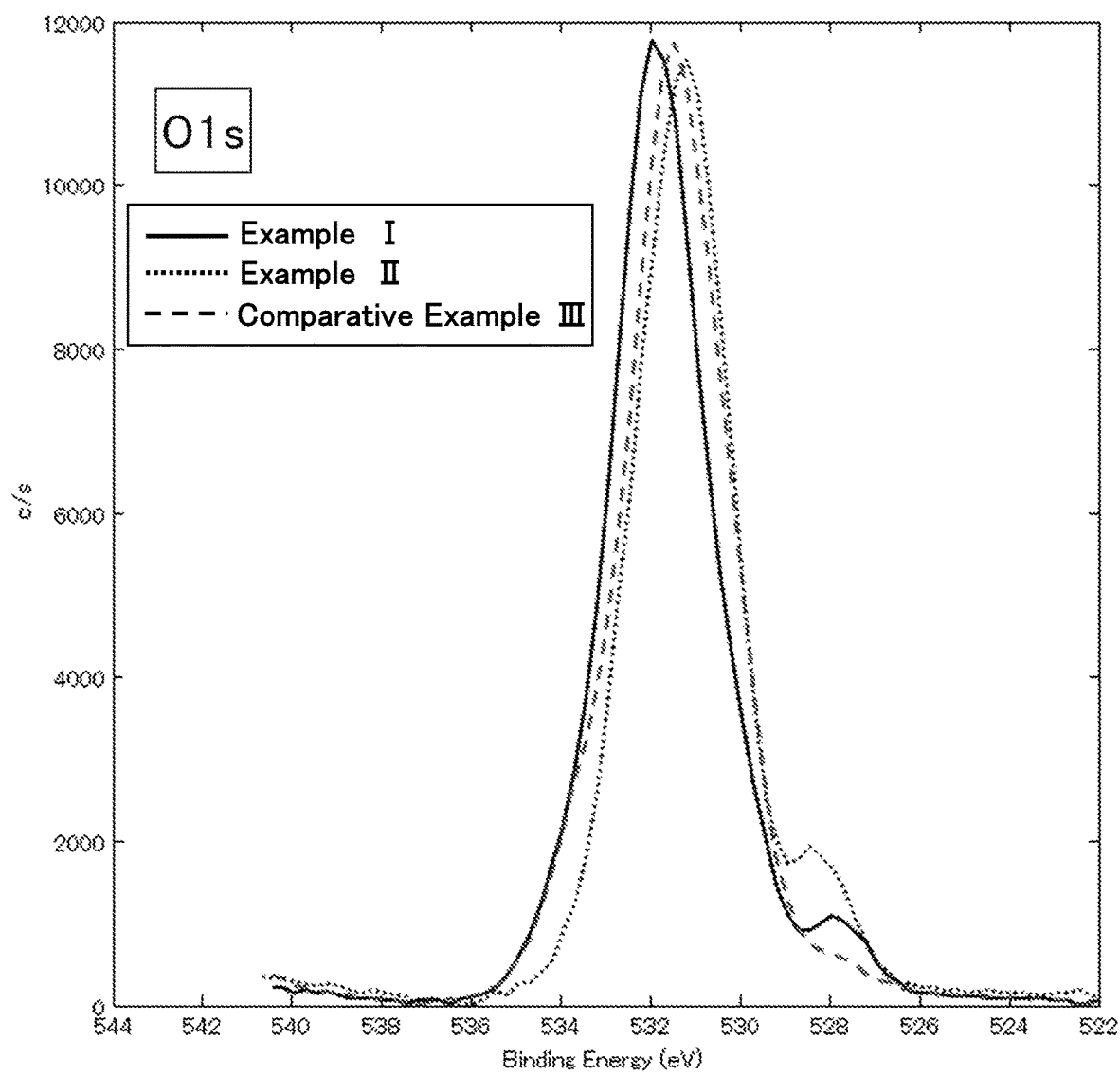
FIG. 2 is an X-ray photoelectron spectroscopy analysis chart regarding oxygen element in the lithium ion secondary batteries of Example I, Example II and Comparative Example III in Evaluation Example II.
Figure 3:
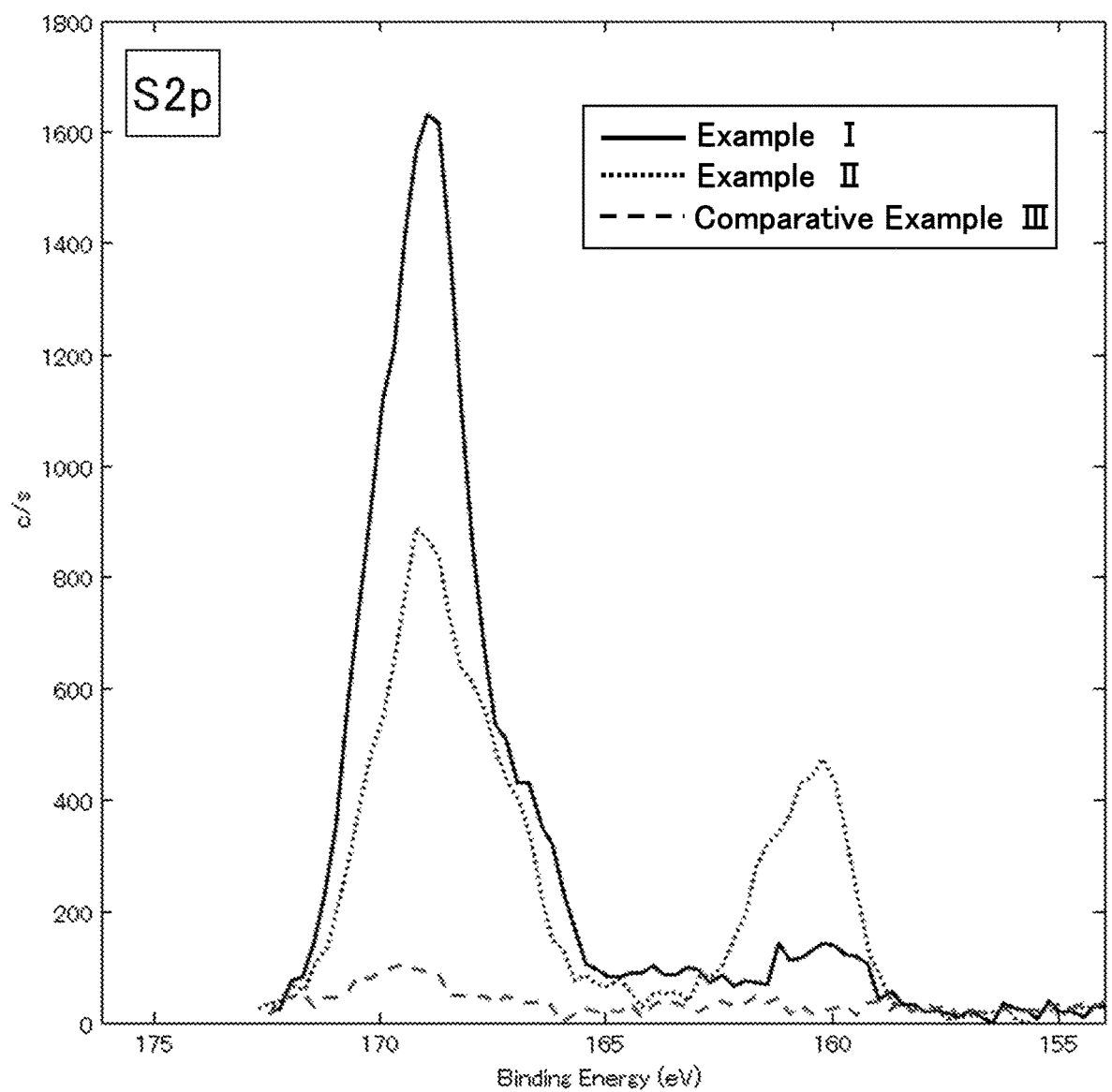
FIG. 3 is an X-ray photoelectron spectroscopy analysis chart regarding sulfur element in the lithium ion secondary batteries of Example I, Example II and Comparative Example III in Evaluation Example II.

Apparatus: ULVAC-PHI, Inc., PHI5000 VersaProbe II
X-ray source: monochromatic Al K-alpha radiation, voltage 15 kV, current 10 mA FIG. 1 shows an analysis chart regarding carbon element measured in the lithium ion secondary batteries of Example I, Example II, and Comparative Example III, FIG. 2 shows an analysis chart regarding oxygen element measured therein, and FIG. 3 shows an analysis chart regarding sulfur element measured therein.

From the coatings of the lithium ion secondary batteries of Example I and Example II, presence of the 169 eV peak and the 160 eV peak regarding S, the 532 eV peak and the 528 eV peak regarding O, and the 290 eV peak, the 285 eV peak, and the 283 eV peak regarding C was confirmed.

On the other hand, from the coating of the lithium ion secondary battery of Comparative Example III, presence of the 169 eV peak and the 160 eV peak regarding S was not confirmed.

Table 5 shows percentages of target elements Li, C, N, O, F, and S obtained through the above analysis with respect to the lithium ion secondary batteries of Example IV and Example VI.

TABLE 5

| | Li | C | N | O | F | S |
|---|---|---|---|---|---|---|
| Example IV | 17.0% | 39.8% | 2.6% | 34.2% | 2.9% | 3.6% |
| Example VI | 20.8% | 35.4% | 2.5% | 35.4% | 2.7% | 3.2% |

Of the percentage 39.8% of C analyzed with respect to the lithium ion secondary battery of Example IV, 7.1% was derived from the 283 eV peak. Of the percentage 35.4% of C analyzed with respect to the lithium ion secondary battery of Example VI, 3.3% was derived from the 283 eV peak.

The difference in amount of the 283 eV peak between both lithium ion secondary batteries is inferred to have influenced the resistance during charging and discharging and the values of input and output shown in Table 4.

Figure 4:
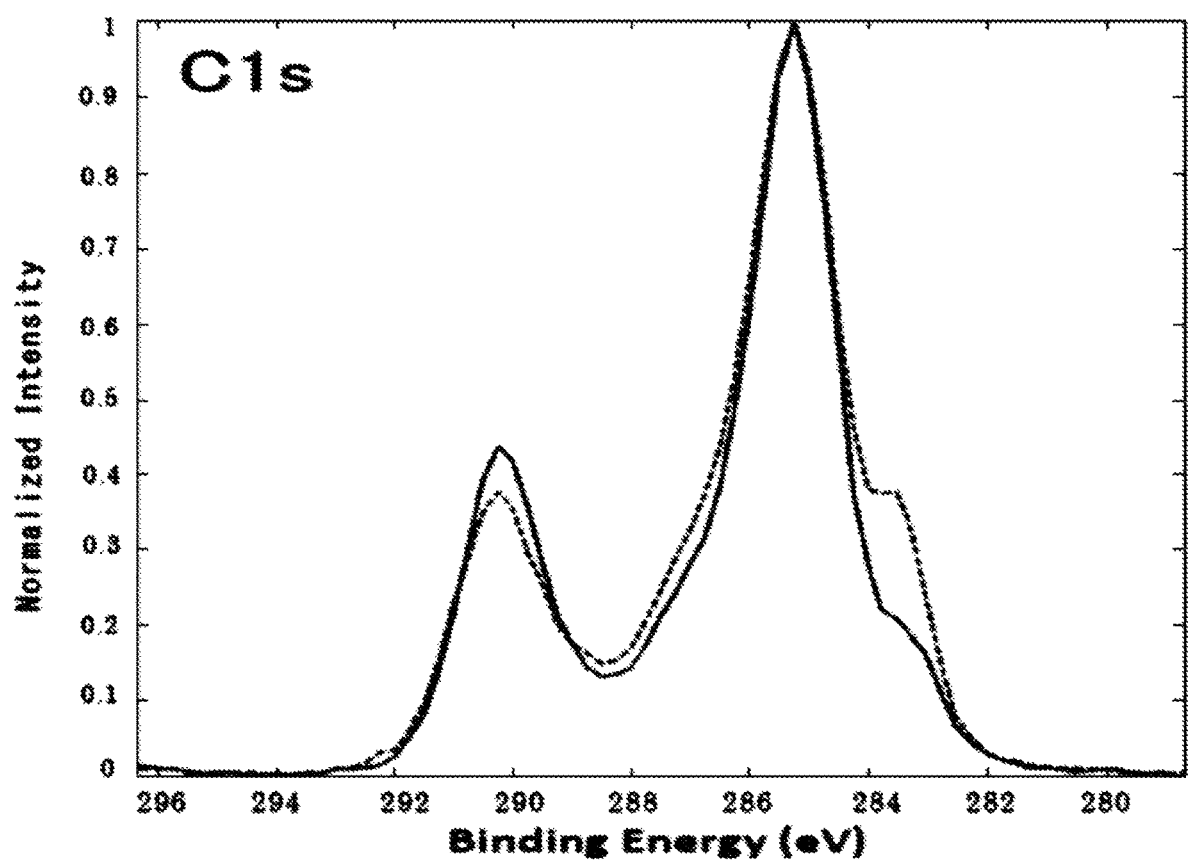
FIG. 4 is an X-ray photoelectron spectroscopy analysis chart regarding carbon element in lithium ion secondary batteries of Example IV and Example VI in Evaluation Example II.

FIG. 4 shows an analysis chart regarding carbon element measured in the lithium ion secondary batteries of Example IV and Example VI. In FIG. 4, the dotted line shows the peak obtained from the negative electrode of the lithium ion secondary battery of Example IV, and the solid line shows the peak obtained from the negative electrode of the lithium ion secondary battery of Example VI. With reference to FIG. 4, presence of the 290 eV peak, the 285 eV peak, and the 283 eV peak is confirmed.

The peaks above are inferred to be derived from DMC and/or EMC contained in the electrolytic solution of Production Example 7-2.

With reference to FIG. 4, in the lithium ion secondary battery of Example IV, when the measured intensity of the 285 eV peak is assumed to be 100, the intensity of the 283 eV peak is understood to be about 40. Similarly, in the lithium ion secondary battery of Example VI, the intensity of the 283 eV peak is understood to be about 20. In the carbon element charts obtained from the lithium ion secondary batteries of Example IV and Example VI, the difference in intensity value of the 283 eV peak is the greatest. From the results, the difference in amount of the 283 eV peak between both lithium ion secondary batteries is inferred to have influenced the values of resistance during charging and discharging shown in Table 4.

Table 6 shows the relationships among the peak intensities observed in the above-described analysis. In Table 6, a relationship 1 means the value of ((intensity of 528 eV peak)/(intensity of 285 eV peak)), a relationship 2 means the value of (((intensity of 528 eV peak)+(intensity of 169 eV peak))/(intensity of 285 eV peak)), and a relationship 3 means the value of (((intensity of 528 eV peak)+(intensity of 160 eV peak))/(intensity of 285 eV peak)). As the peak intensity here, the value (counts/sec) of the peak height from a baseline to the peak top was used.

TABLE 6

|  | Relationship 1 | Relationship 2 | Relationship 3 |
|---|---|---|---|
| Example I | 0.19 | 0.45 | 0.21 |
| Example II | 0.32 | 0.47 | 0.40 |
| Comparative Example III | 0.10 | 0.12 | 0.11 |
| Comparative Example IV | 0.17 | 0.20 | 0.18 |

Regarding any of the values of the relationship 1, the relationship 2, and the relationship 3, the values of the lithium ion secondary batteries of the Examples are understood to be higher. The suitable secondary battery of the present invention is supported to satisfy relational expression 1 to relational expression 3 below.

((intensity of 528 eV peak)/(intensity of 285 eV peak))≥0.18    Relational expression 1

(((intensity of 528 eV peak)+(intensity of 169 eV peak))/(intensity of 285 eV peak))≥0.21    Relational expression 2

(((intensity of 528 eV peak)+(intensity of 160 eV peak))/(intensity of 285 eV peak))≥0.19    Relational expression 3

From the results of Comparative Example III, the relational expression 1 to relational expression 3 are considered not to be satisfied even when a conventional general activation process is performed on a lithium ion secondary battery including a conventional general electrolytic solution. In addition, from the results of Comparative Example IV, satisfaction of the relational expression 1 to relational expression 3 is considered to be difficult even when the activation method used in the method for producing the secondary battery of the present invention is used for a lithium ion secondary battery including a conventional general electrolytic solution.

Taking into consideration the results in Table 4 and Table 6 in combination, the value of the relationship 1, the relationship 2, or the relationship 3 and the resistance values during charging and discharging are inferred to correlate with each other to a certain extent. The lithium ion secondary batteries of Example I and Example II suitably reduce the resistance during charging and discharging since the value of the relationship 1, the relationship 2, or the relationship 3 is relatively high, and are considered to have exhibited a suitable capacity retention rate.

The 528 eV peak regarding O in the relationships 1 to 3 is inferred to be attributed to at least one of O—Li bond and Li—O—Li bond. Thus, in the coatings of the lithium ion secondary batteries of Example I and Example II, Li is considered to be present in a large amount, and O capable of coordinating with Li is considered to be present in a large amount. In the lithium ion secondary battery having such a coating, since Li is present in a large amount in the coating and O capable of coordinating with Li suitably assists Li ions in moving at a high speed within the coating, the rate of Li transportation between the electrolytic solution and an active material interface via the coating is improved, and thus the resistance during charging and discharging is speculated to have been suitably reduced as shown in Table 4.

The 169 eV peak regarding S in the relationship 2 is inferred to be attributed to at least one of S-Ox bond and S═O bond. Thus, in the coatings of the lithium ion secondary batteries of Example I and Example II, many S-Ox bonds or S═O bonds capable of coordinating with Li ions are considered to be present. When many S-Ox bonds or S═O bonds are present in the coating, those bonds suitably assist Li ions in moving at a high speed within the coating, and thus the resistance during charging and discharging is speculated to have been suitably reduced as shown in Table 4.

As shown in Table 4, in the lithium ion secondary battery of Example I, the resistance during charging and discharging was reduced compared to that in the lithium ion secondary batteries of Examples IV to VI, but, whereas the direct current resistance during charging after step (b) of the activation process in Example I was 15.9Ω, the direct current resistance during charging after step (b) of the activation process in Examples IV to VI was 14.7Ω. That is, only after step (b), the resistance was reduced in the secondary batteries of Examples IV to VI, compared to that in Example I. Here, in view of resistance of the metal salt and the linear carbonate to oxidative and reductive degradation, a coating derived from a degradation product of the chemical structure represented by the general formula (1) in the metal salt is inferred to be initially formed, and a coating derived from the linear carbonate represented by the general formula (2) is inferred to be then formed. However, the charging rate in step (a-2) of the activation process used in Example I is higher than the charging rate in step (a-1) of the activation process in Examples IV to VI. Therefore, in the secondary battery of Example I, a coating derived from the linear carbonate is speculated to have been formed before a coating having at least one of S-Ox bond and S═O bond derived from the metal salt was sufficiently formed. Taking into consideration the above-described results, in the lithium ion secondary battery of Example I, the following is inferred: since the resistance after step (b) was high, lithium ions were not smoothly occluded by and released from the negative electrode active material in step (c), and thus Li was present in a large amount on the negative electrode surface, so that a coating having at least one of O—Li bond and Li—O—Li bond was formed in a larger amount than that in the batteries of Examples IV to VI, and the resistance was reduced after step (c).

Example X

A lithium ion secondary battery of Example X was produced in the following manner, using the electrolytic solution of Production Example 8-1.

90 parts by mass of $Li_{1.1}Ni_{5/10}CO_{3.5/10}Mn_{1.5/10}O_2$ serving as the positive electrode active material, 8 parts by mass of acetylene black serving as the conductive additive, and 2 parts by mass of polyvinylidene fluoride serving as the binding agent were mixed. This mixture was dispersed in a proper amount of N-methyl-2-pyrrolidone to create a slurry. As the positive electrode current collector, an aluminum foil corresponding to JIS A1000 series and having a thickness of 15 μm was prepared. The slurry was applied in a film form on the surface of the aluminum foil by using a doctor blade. The aluminum foil on which the slurry was applied was dried for 20 minutes at 80° C. to remove N-methyl-2-pyrrolidone. Then, the aluminum foil was pressed to obtain a joined object. The obtained joined object was heated and dried in a vacuum dryer for 6 hours at 120° C. to obtain an aluminum foil having a positive electrode active material layer formed thereon. This was used as the positive electrode. The positive electrode active material layer was formed at 6 mg/cm² per unit area of the applied surface of the positive electrode current collector. The density of the positive electrode active material layer was 2.5 g/cm³.

98 parts by mass of spheroidal graphite serving as the negative electrode active material, and 1 part by mass of styrene-butadiene-rubber and 1 part by mass of carboxymethyl cellulose, which both served as the binding agent, were mixed. This mixture was dispersed in a proper amount of ion exchanged water to create a slurry. As the negative electrode current collector, a copper foil having a thickness of 10 μm was prepared. The slurry was applied in a film form on the surface of the copper foil by using a doctor blade. The copper foil on which the slurry was applied was dried to remove water. Then, the copper foil was pressed to obtain a joined object. The obtained joined object was heated and dried in a vacuum dryer for 6 hours at 100° C. to obtain a copper foil having a negative electrode active material layer formed thereon. This was used as the negative electrode. The negative electrode active material layer was formed on the negative electrode current collector at 4 mg/cm$^2$ per unit area of the applied surface. The density of the negative electrode active material layer was 1.1 g/cm$^3$.

As the separator, a porous film made from polypropylene and having a thickness of 20 μm was prepared. An electrode assembly was formed by sandwiching the separator between the positive electrode and the negative electrode. The electrode assembly was covered with a set of two sheets of a laminate film. The laminate film was formed into a bag-like shape by having three sides thereof sealed, and the electrolytic solution of Example 1-1 was poured into the laminate film. Four sides were sealed airtight by sealing the remaining one side to obtain a lithium ion secondary battery in which the electrode assembly and the electrolytic solution were sealed.

The following activation process was performed on the obtained lithium ion secondary battery.

Step (a-1)

With respect to the lithium ion secondary battery, charging was performed up to a first voltage 3.0 V at a first rate 0.05C, and then charging was performed up to a second voltage 4.10 V at a second rate 1.0C. Then, the second voltage 4.10 V was kept at 25° C. for 1.0 hour.

Step (b)

With respect to the lithium ion secondary battery having been subjected to step (a-1), discharging was performed down to 3 V at a third rate 2C, and then, the voltage 3 V was kept for 1 hour at 25° C.

Step (c)

With respect to the lithium ion secondary battery having been subjected to step (b), charging and discharging was performed at a fourth rate 5C at 60° C., between a third voltage 3.3 V and the second voltage 4.1 V. The lithium ion secondary battery for which the above charging and discharging had been repeated 29 times was used as the lithium ion secondary battery of Example X.

Example XI

A lithium ion secondary battery of Example XI was produced using a method similar to that in Example X except for using the electrolytic solution of Production Example 8-2.

Example XII

A lithium ion secondary battery of Example XII was produced using a method similar to that in Example X except for using the electrolytic solution of Production Example 8-3.

Example XIII

A lithium ion secondary battery of Example XIII was produced using a method similar to that in Example X except for using the electrolytic solution of Production Example 8-4.

Example XIV

A lithium ion secondary battery of Example XIV was produced using a method similar to that in Example X except for using the electrolytic solution of Production Example 8-5.

Example XV

A lithium ion secondary battery of Example XV was produced using a method similar to that in Example X except for using the electrolytic solution of Production Example 8-6.

Example XVI

A lithium ion secondary battery of Example XVI was produced using a method similar to that in Example X except for using the electrolytic solution of Production Example 8-7.

Example XVII

A lithium ion secondary battery of Example XVII was produced using a method similar to that in Example X except for using the electrolytic solution of Production Example 8-8.

Example XVIII

A lithium ion secondary battery of Example XVIII was produced using a method similar to that in Example X except for using the electrolytic solution of Production Example 8-9.

Comparative Example V

A lithium ion secondary battery of Comparative Example V was produced using a method similar to that in Example X except for using the electrolytic solution of Comparative Production Example 1.

Evaluation Example III: Capacity Retention Rate

With respect to the respective lithium ion secondary batteries of Examples X to XVIII and Comparative Example V, the following test was performed to evaluate the capacity retention rate.

For each of the lithium ion secondary batteries, a 4.1 V-3.0 V charging and discharging cycle of, with a constant current at 1C rate at a temperature of 60° C., charging up to 4.1 V and then discharging down to 3.0 V was performed by 100 cycles. The capacity retention rate (%) of each lithium ion secondary battery after 100 cycles was obtained by the following formula. Table 7 shows the results.

Capacity retention rate (%)=(B/A)×100

A: discharge capacity at first charging and discharging cycle

B: discharge capacity at 100-th cycle

TABLE 7

| Battery | Electrolytic solution | Metal salt | Metal salt concentration (mol/L) | Mass % of vinylene carbonate | Capacity retention rate (%) |
|---|---|---|---|---|---|
| Example X | Production Example 8-1 | LiFSA | 2.4 | 0 | 93 |
| Example XI | Production Example 8-2 | LiFSA | 2.4 | 0.13 | 95 |
| Example XII | Production Example 8-3 | LiFSA | 2.4 | 0.63 | 95 |
| Example XIII | Production Example 8-4 | LiFSA | 2.4 | 1.0 | 95 |
| Example XIV | Production Example 8-5 | LiFSA | 2.4 | 1.3 | 96 |
| Example XV | Production Example 8-6 | LiFSA | 2.4 | 2.5 | 96 |
| Example XVI | Production Example 8-7 | LiFSA | 2.4 | 6.3 | 96 |
| Example XVII | Production Example 8-8 | LiFSA | 2.4 | 1.0 | 96 |
| Example XVIII | Production Example 8-9 | LiFSA | 2.4 | 1.0 | 96 |
| Comparative Example V | Comparative Production Example 1 | $LiPF_6$ | 1.0 | 0 | 92 |

From Table 7, each of the capacity retention rates of the respective lithium ion secondary batteries of the Examples is understood to be better than the capacity retention rate of the lithium ion secondary battery of Comparative Example V. In addition, from the results of Examples X to XVIII, the capacity retention rate is understood to improve due to the presence of vinylene carbonate.

Evaluation Example IV: Direct Current Resistance

With respect to the lithium ion secondary batteries of Examples X to XVIII, the following test was performed to evaluate the direct current resistance.

Further, for each of the lithium ion secondary batteries, the voltage was adjusted to 3.65 V with a constant current at 0.5C rate at a temperature of −10° C., and then, constant current charging was performed at 3C rate for 10 seconds. From the current value and the amount of change in voltage before and after this charging, the direct current resistance during charging was calculated according to Ohm's law.

Similarly, for each of the lithium ion secondary batteries, the voltage was adjusted to 3.65 V with a constant current at 0.5C rate at a temperature of −10° C., and then, constant current discharging was performed at 3C rate for 2 seconds. From the current value and the amount of change in voltage before and after this discharging, the direct current resistance during discharging was calculated according to Ohm's law. Table 8 shows the results of the above.

TABLE 8

| | Mass % of vinylene carbonate | Direct current resistance during charging (Ω) | Direct current resistance during discharging (Ω) |
|---|---|---|---|
| Example X | 0 | 7.5 | 6.3 |
| Example XI | 0.13 | 6.8 | 5.7 |
| Example XII | 0.63 | 5.5 | 4.4 |
| Example XIII | 1.0 | 6.3 | 5.2 |
| Example XIV | 1.3 | 7.1 | 5.9 |
| Example XV | 2.5 | 9.5 | 8.8 |
| Example XVI | 6.3 | 16.9 | 14.9 |
| Example XVII | 1.0 | 6.7 | 5.5 |
| Example XVIII | 1.0 | 6.9 | 5.7 |

From the results in Table 8, the direct current resistance is understood to decrease in the electrolytic solution in which vinylene carbonate was appropriately added, but the direct current resistance is understood to increase in the electrolytic solution in which vinylene carbonate was excessively added. From the viewpoint of direct current resistance, among the electrolytic solutions of the present invention, an electrolytic solution containing vinylene carbonate by greater than 0 and less than 2.5 mass % relative to the entire electrolytic solution is considered to be preferable.

Evaluation Example V: Analysis of Coating

The coatings on the negative electrode active material surfaces of the lithium ion secondary batteries of Examples X to XII and XIV to XVI were analyzed by the following method.

Each lithium ion secondary battery was discharged down to 3V. Then, each secondary battery was disassembled, and the negative electrode was taken out. Each negative electrode was washed by performing operation of immersing the negative electrode in dimethyl carbonate for 10 minutes three times, then dried, and used as the analysis target negative electrode. All steps from disassembling each lithium ion secondary battery to transporting each analysis target negative electrode to an analyzer were performed in an Ar gas atmosphere. Coating of each analysis target negative electrode surface was analyzed under the following condition by using an X-ray photoelectron spectroscopy.

Apparatus: ULVAC-PHI, Inc., PHI5000 VersaProbe II

X-ray source: monochromatic Al K-alpha radiation, voltage 15 kV, current 10 mA

Table 9 shows percentages of target elements Li, C, N, O, F, and S obtained through the above analysis with respect to each lithium ion secondary battery.

TABLE 9

| | Mass % of vinylene carbonate | Li (%) | C (%) | N (%) | O (%) | F (%) | S (%) |
|---|---|---|---|---|---|---|---|
| Example X | 0 | 18.7 | 40.1 | 3.1 | 30.7 | 4.2 | 3.2 |
| Example XI | 0.13 | 18.9 | 41.2 | 2.3 | 32.1 | 2.9 | 2.6 |
| Example XII | 0.63 | 19.4 | 41.6 | 1.6 | 32.5 | 3.0 | 1.9 |
| Example XIV | 1.3 | 15.3 | 48.1 | 1.6 | 30.5 | 2.3 | 2.2 |
| Example XV | 2.5 | 14.6 | 49.2 | 1.4 | 31.2 | 1.9 | 1.7 |
| Example XVI | 6.3 | 12.4 | 50.5 | 1.2 | 33.2 | 1.5 | 1.2 |

Table 9 supports that the coatings on the negative electrode surfaces of the lithium ion secondary batteries of Examples X to XII and XIV to XVI contain S, O, and C. In addition, the carbon content of the coating is understood to relatively increase with an increase in mass % of vinylene carbonate.

A 528 eV peak, a 169 eV peak, a 290 eV peak, and a 285 eV peak were observed in each analysis chart. Table 10 shows the relationships among the intensities of the peaks observed in the above-described analysis. Table 10 also shows the relationships among the intensities of the above-described peaks observed in the analysis chart of Comparative Example III in Evaluation Example II described above. A relationship 4 means the value of (((intensity of 528 eV peak)+(intensity of 169 eV peak)+(intensity of 290 eV peak))/(intensity of 285 eV peak)). As the peak intensity here, the value (counts/sec) of the peak height from a baseline to the peak top was used.

TABLE 10

| | Relationship 4 | Outline of activation process |
|---|---|---|
| Example X | 0.51 | (a-1) 0.05 C→1.0 C charging |
| Example XI | 0.48 | (b) 2 C discharging |
| Example XII | 0.45 | (c) 5 C charging and discharging, 29 cycles, 60° C. |
| Example XIV | 0.40 | |
| Example XV | 0.39 | |
| Example XVI | 0.41 | |
| Comparative Example III | 0.32 | 0.1 C charging, 0.1 C discharging |

The value of the relationship 4 of the lithium ion secondary battery of each Example is found to be higher than that of the lithium ion secondary battery of Comparative Example III. The suitable secondary battery of the present invention is supported to satisfy the following relational expression 4. From the results of Comparative Example III, satisfaction of the relational expression 4 is considered to be difficult even when a conventional general activation process is performed on a lithium ion secondary battery including a conventional general electrolytic solution.

$$(((\text{intensity of 528 eV peak})+(\text{intensity of 169 eV peak})+(\text{intensity of 290 eV peak}))/(\text{intensity of 285 eV peak})) \geq 0.33 \quad \text{Relational expression 4}$$

The 528 eV peak regarding O in the relational expression 4 is inferred to be attributed to at least one of O—Li bond and Li—O—Li bond. The 169 eV peak regarding S in the relational expression 4 is inferred to be attributed to at least one of S-Ox bond and S=O bond. The 290 eV peak regarding C in the relational expression 4 is inferred to be attributed to at least one of O—C=O—O bond, O—C=O bond, and O—C—O bond. These bonds are each considered to suitably assist Li ions in moving within the coating with high reproducibility. Thus, the suitable secondary battery of the present invention that satisfies the relational expression 4 is inferred to exhibit excellent battery characteristics.

Example XIX

A lithium ion secondary battery of Example XIX was produced using a method similar to that in Example I except for using the electrolytic solution of Production Example 9-1.

Example XX

A lithium ion secondary battery of Example XX was produced using a method similar to that in Example I except for using the electrolytic solution of Production Example 9-2.

Example XXI

A lithium ion secondary battery of Example XXI was produced using a method similar to that in Example I except for using the electrolytic solution of Production Example 9-3.

Example XXII

A lithium ion secondary battery of Example XXII was produced using a method similar to that in Example I except for using the electrolytic solution of Production Example 10-1.

Example XXIII

A lithium ion secondary battery of Example XXIII was produced using a method similar to that in Example I except for using the electrolytic solution of Production Example 10-2.

Example XXIV

A lithium ion secondary battery of Example XXIV was produced using a method similar to that in Example I except for using the electrolytic solution of Production Example 10-3.

Example XXV

A lithium ion secondary battery of Example XXV was produced using a method similar to that in Example II except for using the electrolytic solution of Production Example 9-1.

Example XXVI

A lithium ion secondary battery of Example XXVI was produced using a method similar to that in Example II except for using the electrolytic solution of Production Example 9-2.

Example XXVII

A lithium ion secondary battery of Example XXVII was produced using a method similar to that in Example II except for using the electrolytic solution of Production Example 9-3.

Example XXVIII

A lithium ion secondary battery of Example XXVIII was produced using a method similar to that in Example II except for using the electrolytic solution of Production Example 10-1.

Example XXIX

A lithium ion secondary battery of Example XXIX was produced using a method similar to that in Example II except for using the electrolytic solution of Production Example 10-2.

Example XXX

A lithium ion secondary battery of Example XXX was produced using a method similar to that in Example II except for using the electrolytic solution of Production Example 10-3.

Comparative Example VI

A lithium ion secondary battery of Comparative Example VI was produced using a method similar to that in Example I except for setting the charging rate in step (a-2) to 0.1C and using the electrolytic solution of Production Example 9-1.

Comparative Example VII

A lithium ion secondary battery of Comparative Example VII was produced using a method similar to that in Comparative Example VI except for using the electrolytic solution of Production Example 9-2.

Comparative Example VIII

A lithium ion secondary battery of Comparative Example VIII was produced using a method similar to that in Comparative Example VI except for using the electrolytic solution of Production Example 9-3.

Comparative Example IX

A lithium ion secondary battery of Comparative Example IX was produced using a method similar to that in Comparative Example VI except for using the electrolytic solution of Production Example 10-1.

Comparative Example X

A lithium ion secondary battery of Comparative Example X was produced using a method similar to that in Comparative Example VI except for using the electrolytic solution of Production Example 10-2.

Comparative Example XI

A lithium ion secondary battery of Comparative Example XI was produced using a method similar to that in Comparative Example VI except for using the electrolytic solution of Production Example 10-3.

Evaluation Example VI: Direct Current Resistance

For the lithium ion secondary batteries of Example I, Examples XIX to XXIX, Comparative Example III, and Comparative Examples VI to XI, the voltage was adjusted to 3.65 V with a constant current at 0.5C rate at a temperature of 25° C., and then, constant current charging was performed at 15C rate for 10 seconds. From the current value and the amount of change in voltage before and after this charging, the direct current resistance during charging was calculated according to Ohm's law. Similarly, for each of the lithium ion secondary batteries, the voltage was adjusted to 3.65 V with a constant current at 0.5C rate at a temperature of 25° C., and then, constant current discharging was performed at 15C rate for 10 seconds. From the current value and the amount of change in voltage before and after this discharging, the direct current resistance during discharging was calculated according to Ohm's law. Table 11 shows the results.

TABLE 11

| Battery | Electrolytic solution Solvent of electrolytic solution Mole ratio of solvent to metal salt | Outline of activation process | Direct current resistance during charging ($\Omega$) | Direct current resistance during discharging ($\Omega$) |
|---|---|---|---|---|
| Example I | Production Example 7-2 DMC and EMC (mole ratio 9:1) 3.6 | (a-2) 1 C charging (b) 1 C discharging (c) 2 C charging and discharging, 29 cycles, 60° C. | 2.63 | 2.67 |
| Example XIX | Production Example 9-1 DMC and EMC (mole ratio 9:1) 5 | | 1.42 | 1.51 |
| Example XX | Production Example 9-2 DMC and EMC (mole ratio 8:2) 5 | | 1.48 | 1.58 |
| Example XXI | Production Example 9-3 DMC and EMC (mole ratio 7:3) 5 | | 1.48 | 1.56 |
| Example XXII | Production Example 10-1 DMC and DEC (mole ratio 9:1) 5 | | 1.44 | 1.51 |
| Example XXIII | Production Example 10-2 DMC and DEC (mole ratio 8:2) 5 | | 1.50 | 1.58 |
| Example XXIV | Production Example 10-3 DMC and DEC (mole ratio 7:3) 5 | | 1.54 | 1.63 |
| Example XXV | Production Example 9-1 | (a-2) 5 C charging (b) 1 C discharging (c) 2 C charging and discharging, 29 cycles, 60° C. | 1.42 | 1.51 |
| Example XXVI | Production Example 9-2 | | 1.44 | 1.54 |
| Example XXVII | Production Example 9-3 | | 1.49 | 1.57 |
| Example XXVIII | Production Example 10-1 | | 1.42 | 1.51 |
| Example XXIX | Production Example 10-2 | | 1.50 | 1.58 |
| Comparative Example III | Comparative Production Example 1 DMC, EMC, and EC (volume ratio 4:3:3) 10 | 0.1 C charging, 0.1 C discharging | 2.73 | 2.95 |
| Comparative Example VI | Production Example 9-1 | (a-2) 0.1 C charging (b) 1 C discharging (c) 2 C charging and discharging, 29 cycles, 60° C. | 1.46 | 1.55 |
| Comparative Example VII | Production Example 9-2 | | 1.48 | 1.56 |
| Comparative Example VIII | Production Example 9-3 | | 1.48 | 1.56 |
| Comparative Example IX | Production Example 10-1 | | 1.50 | 1.60 |
| Comparative Example X | Production Example 10-2 | | 1.54 | 1.62 |

TABLE 11-continued

| Battery | Electrolytic solution Solvent of electrolytic solution Mole ratio of solvent to metal salt | Outline of activation process | Direct current resistance during charging (Ω) | Direct current resistance during discharging (Ω) |
|---|---|---|---|---|
| Comparative Example XI | Production Example 10-3 | | 1.57 | 1.64 |

The direct current resistance during charging and during discharging in the lithium ion secondary battery of each Example was lower than that in the lithium ion secondary battery of Comparative Example III which includes the electrolytic solution of Comparative Production Example 1 being a conventional electrolytic solution and in which a general activation process was performed. In addition, from comparison between Example I and Example XIX, the secondary battery including the electrolytic solution in which the mole ratio of the linear carbonate relative to the metal salt is about 5 is considered to have low charging and discharging resistance. Furthermore, from the results of Examples XIX to XXIX, among the secondary batteries including the electrolytic solutions containing the mixed solvents of DMC and EMC and the secondary batteries including the electrolytic solutions containing the mixed solvents of DMC and DEC, the charging and discharging resistance of the former is considered to tend to be lower. Among the secondary batteries including the electrolytic solutions containing the mixed solvents of DMC and EMC and the secondary batteries including the electrolytic solutions containing the mixed solvents of DMC and DEC, the secondary batteries including the electrolytic solutions having lower proportions of EMC and DEC are considered to tend to have lower charging and discharging resistance.

Evaluation Example VII: Reaction Resistance

For the lithium ion secondary batteries of Examples XIX to XXIX and Comparative Examples VI to XI, the voltage was adjusted to 3.5 V, and an alternating current impedance was measured in a voltage range of ±10 mV. The reaction resistance of the negative electrodes was analyzed at a voltage of 3.5 V on the basis of the sizes of arcs observed on obtained complex impedance planar plots. Table 12 shows the results.

TABLE 12

| Battery | Electrolytic solution, solvent of electrolytic solution | Outline of activation process | Reaction resistance (Ω) |
|---|---|---|---|
| Example XIX | Production Example 9-1 DMC and EMC (mole ratio 9:1) | (a-2) 1 C charging (b) 1 C discharging (c) 2 C charging and discharging, 29 cycles, 60° C. | 0.437 |
| Example XX | Production Example 9-2 DMC and EMC (mole ratio 8:2) | | 0.447 |
| Example XXI | Production Example 9-3 DMC and EMC (mole ratio 7:3) | | 0.459 |
| Example XXII | Production Example 10-1 DMC and DEC (mole ratio 9:1) | | 0.447 |
| Example XXIII | Production Example 10-2 DMC and DEC (mole ratio 8:2) | | 0.468 |
| Example XXIV | Production Example 10-3 DMC and DEC (mole ratio 7:3) | | 0.481 |
| Example XXV | Production Example 9-1 | (a-2) 5 C charging | 0.417 |
| Example XXVI | Production Example 9-2 | (b) 1 C discharging | 0.436 |
| Example XXVII | Production Example 9-3 | (c) 2 C charging and discharging, 29 cycles, 60° C. | 0.459 |
| Example XXVIII | Production Example 10-1 | | 0.431 |
| Example XXIX | Production Example 10-2 | | 0.460 |
| Comparative Example VI | Production Example 9-1 | (a-2) 0.1 C charging | 0.446 |
| Comparative Example VII | Production Example 9-2 | (b) 1 C discharging | 0.453 |
| Comparative Example VIII | Production Example 9-3 | (c) 2 C charging and discharging, 29 cycles, 60° C. | 0.461 |
| Comparative Example IX | Production Example 10-1 | | 0.455 |
| Comparative Example X | Production Example 10-2 | | 0.464 |
| Comparative Example XI | Production Example 10-3 | | 0.517 |

From Table 12, the reaction resistance of the secondary battery for which the charging rate in step (a-2) is higher is considered to tend to be lower. In addition, from the results of Examples XIX to XXIX, among the secondary batteries including the electrolytic solutions containing the mixed solvents of DMC and EMC and the secondary batteries including the electrolytic solutions containing the mixed solvents of DMC and DEC, the reaction resistance of the former is considered to tend to be lower. Among the secondary batteries including the electrolytic solutions containing the mixed solvents of DMC and EMC and the secondary batteries including the electrolytic solutions containing the mixed solvents of DMC and DEC, the secondary batteries including the electrolytic solutions having lower proportions of EMC or DEC are considered to tend to have lower reaction resistance.

The invention claimed is:

1. A method for producing a secondary battery,
the method comprises
providing a negative electrode, a positive electrode, and an electrolytic solution, and
forming a coating containing S, O, and C on a surface of a negative electrode and/or a positive electrode by performing, on the negative electrode, the positive electrode, and the electrolytic solution, an activation process including step (a), step (b), and step (c) below, or step (a) and step (d) below,
(a) step of performing charging to a second voltage $V_2$ in step (a-1) or step (a-2) below, (a-1) step of continuously performing charging at a first rate $C_1$ to a first voltage $V_1$ and then performing charging at a second rate $C_2$ to the second voltage $V_2$ where $V_1<V_2$, and $C_1<C_2$, (a-2) step of performing charging at a constant charging rate $C_{a-2}$ of 1 C or higher to the second voltage $V_2$, (b) step of discharging the secondary battery having been subjected to step (a), at a third rate $C_3$ to a third voltage $V_3$ or lower, (c) step of performing charging and discharging at a fourth rate $C_4$ between the third voltage $V_3$ and the second voltage $V_2$, (d) step of keeping the temperature of the secondary battery in a range of 40 to 120° C., wherein the electrolytic solution contains a metal salt whose cation is an alkali metal, an alkaline earth metal, or aluminum and whose anion has a chemical structure represented by general formula (1) below, and a linear carbonate represented by general formula (2) below, the linear carbonate being contained by not less than 90 vol % relative to an entire organic solvent, a mole ratio of the linear carbonate relative to the metal salt being 2 to 6, $$(R^1X^1)(R^2SO_2)N \qquad \text{general formula (1)}$$

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^1$ and $R^2$ optionally bind with each other to form a ring, $X^1$ is selected from $SO_2$, C=O, C=S, $R^a$P=O, $R^b$P=S, S=O, or Si=O, $R^a$ and $R^b$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^a$ and $R^b$ each optionally bind with $R^1$ or $R^2$ to form a ring), $$R^{20}OCOOR^{21} \qquad \text{general formula (2)}$$

($R^{20}$ and $R^{21}$ are each independently selected from $C_nH_aF_bCl_cBr_dI_e$ that is a linear alkyl, or $C_mH_fF_g Cl_hBr_iI_j$ that includes a cyclic alkyl in the chemical structure thereof, "n" is an integer not smaller than 1, "m" is an integer not smaller than 3, and "a", "b", "c", "d", "e", "f", "g", "h", "i", and "j" are each independently an integer not smaller than 0, and satisfy 2n+1=a+b+c+d+e and 2m−1=f+g+h+i+j).

2. A method for producing a secondary battery, providing a negative electrode, a positive electrode, and an electrolytic solution, and forming a coating containing S, O, and C on a surface of a negative electrode and/or a positive electrode by performing, on the negative electrode, the positive electrode, and the electrolytic solution, an activation process including step (a), step (b), and step (c) below, or step (a) and step (d) below, (a) step of performing charging to a second voltage $V_2$ in step (a-1) or step (a-2) below, (a-1) step of continuously performing charging at a first rate $C_1$ to a first voltage $V_1$ and then performing charging at a second rate $C_2$ to the second voltage $V_2$ where $V_1<V_2$, and $C_1<C_2$, (a-2) step of performing charging at a constant charging rate $C_{a-2}$ of 2C or higher to the second voltage $V_2$, (b) step of discharging the secondary battery having been subjected to step (a), at a third rate $C_3$ to a third voltage $V_3$ or lower, (c) step of performing charging and discharging at a fourth rate $C_4$ between the third voltage $V_3$ and the second voltage $V_2$, (d) step of keeping the temperature of the secondary battery in a range of 40 to 120° C., wherein the electrolytic solution contains a metal salt whose cation is an alkali metal, an alkaline earth metal, or aluminum and whose anion has a chemical structure represented by general formula (1) below, and a linear carbonate represented by general formula (2) below, the linear carbonate being contained by not less than 90 vol % relative to an entire organic solvent, a mole ratio of the linear carbonate relative to the metal salt being 2 to 6, $$(R^1X^1)(R^2SO_2)N \qquad \text{general formula (1)}$$

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^1$ and $R^2$ optionally bind with each other to form a ring, $X^1$ is selected from $SO_2$, C=O, C=S, $R^a$ P=O, $R^b$ P=S, S=O, or Si=O, $R^a$ and $R^b$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^a$ and $R^b$ each optionally bind with $R^1$ or $R^2$ to form a ring), $$R^{20}OCOOR^{21} \qquad \text{general formula (2)}$$

($R^{20}$ and $R^{21}$ are each independently selected from $C_nH_aF_bCl_cBr_dI_e$ that is a linear alkyl, or $C_mH_fF_g Cl_hBr_iI_j$ that includes a cyclic alkyl in the chemical structure thereof, "n" is an integer not smaller than 1, "m" is an integer not smaller than 3, and "a", "b", "c", "d", "e", "f", "g", "h", "i", and "j" are each independently an integer not smaller than 0, and satisfy 2n+1=a+b+c+d+e and 2m−1=f+g+h+i+j).

3. The method for producing the secondary battery according to claim 1, wherein
a mole ratio of the linear carbonate relative to the metal salt in the electrolytic solution is 3 to 5.

4. The method for producing the secondary battery according to claim 1, wherein
the chemical structure of the anion of the metal salt is represented by general formula (1-1) below, $$(R^3X^2)(R^4SO_2)N \qquad \text{general formula (1-1)}$$

($R^3$ and $R^4$ are each independently $C_nH_aF_bCl_cBr_dI_e$ $(CN)_f(SCN)_g(OCN)_h$, "n", "a", "b", "c", "d", "e", "f", "g", and "h" are each independently an integer not smaller than 0, and satisfy 2n+1=a+b+c+d+e+f+g+h, $R^3$ and $R^4$ optionally bind with each other to form a ring, and in that case, satisfy 2n=a+b+c+d+e+f+g+h, $X^2$ is selected from $SO_2$, C=O, C=S, $R^c$ P=O, $R^d$ P=S, S=O, or Si=O, $R^c$ and $R^d$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^c$ and $R^d$ each optionally bind with $R^3$ or $R^4$ to form a ring).

5. The method for producing the secondary battery according to claim 1, wherein
the chemical structure of the anion of the metal salt is represented by general formula (1-2) below, $$(R^5SO_2)(R^6SO_2)N \qquad \text{general formula (1-2)}$$

($R^5$ and $R^6$ are each independently $C_nH_aF_bCl_cBr_dI_e$,

"n", "a", "b", "c", "d", and "e" are each independently an integer not smaller than 0, and satisfy 2n+1=a+b+c+d+e, $R^5$ and $R^6$ optionally bind with each other to form a ring, and, in that case, satisfy 2n=a+b+c+d+e).

6. The method for producing the secondary battery according to claim 1, wherein
the metal salt is $(CF_3SO_2)_2NLi$, $(FSO_2)_2NLi$, $(C_2F_5SO_2)_2NLi$, $FSO_2(CF_3SO_2)NLi$, $(SO_2CF_2CF_2SO_2)NLi$, or $(SO_2CF_2CF_2CF_2SO_2)NLi$.

7. The method for producing the secondary battery according to claim 1, wherein
a relationship among the first rate $C_1$, the second rate $C_2$, the third rate $C_3$, and the fourth rate $C_4$ is $C_1<C_2<C_3<C_4$.

8. The method for producing the secondary battery according to claim 1, wherein
the charging rate $C_{a-2}$ in step (a-2) satisfies $1C \leq C_{a-2} \leq 13C$.

9. The method for producing the secondary battery according to claim 1, wherein
the temperature in step (c) is in a range of 40 to 120° C.

10. The method for producing the secondary battery according to claim 1, wherein
step (c) is repeated 5 to 50 times.

11. The method for producing the secondary battery according to claim 1, wherein
the negative electrode includes a graphite having a BET specific surface area of 0.5 to 15 m²/g as a negative electrode active material.

12. The method for producing the secondary battery according to claim 1, wherein
the negative electrode includes a graphite having a BET specific surface area of 4 to 12 m²/g as a negative electrode active material.

13. The method for producing the secondary battery according to claim 11, wherein
the graphite has a mean particle diameter in a range of 2 to 30 μm.

14. The method for producing the secondary battery according to claim 1, wherein
the secondary battery includes a polymer having a hydrophilic group as a binding agent.

15. A secondary battery comprising:
an electrolytic solution containing a metal salt whose cation is an alkali metal, an alkaline earth metal, or aluminum and whose anion has a chemical structure represented by general formula (1) below, and a linear carbonate represented by general formula (2) below, the linear carbonate being contained by not less than 90 vol % relative to an entire organic solvent, a mole ratio of the linear carbonate relative to the metal salt being 2 to 6;
a negative electrode;
a positive electrode; and
a coating on a surface of the negative electrode and/or the positive electrode, the coating containing S, O, and C, when binding energy of elements contained in the coating is measured by using X-ray photoelectron spectroscopy, a peak having a peak top at 528±1.5 eV, a peak having a peak top at 285±1 eV, a peak having a peak top at 169±2 eV, a peak having a peak top at 160±2 eV, or a peak having a peak top at 290±1.5 eV being observed, and a relationship among intensities of these peaks satisfying any one of relational expression 1 to relational expression 4 below, ((intensity of peak having peak top at 528±1.5 eV)/ (intensity of peak having peak top at 285±1 eV))≥0.18,   Relational expression 1

(((intensity of peak having peak top at 528±1.5 eV)+ (intensity of peak having peak top at 169±2 eV))/(intensity of peak having peak top at 285±1 eV))≥0.21,   Relational expression 2

(((intensity of peak having peak top at 528±1.5 eV)+ (intensity of peak having peak top at 160±2 eV))/(intensity of peak having peak top at 285±1 eV))≥0.19,   Relational expression 3

(((intensity of peak having peak top at 528±1.5 eV)+ (intensity of peak having peak top at 169±2 eV)+(intensity of peak having peak top at 290±1.5 eV))/(intensity of peak having peak top at 285±1 eV))≥0.33, and   Relational expression 4 a relationship among intensities of these peaks satisfying Relational expression 1, 2 and 3, or a relationship among intensities of these peaks satisfying Relational expression 4, $(R^1X^1)(R^2SO_2)N$   general formula (1)

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^1$ and $R^2$ optionally bind with each other to form a ring, $X^1$ is selected from $SO_2$, C=O, C=S, $R^a$ P=O, $R^b$ P=S, S=O, or Si=O, $R^a$ and $R^b$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^a$ and $R^b$ each optionally bind with $R^1$ or $R^2$ to form a ring), $R^{20}OCOOR^{21}$   general formula (2)

($R^{20}$ and $R^{21}$ are each independently selected from $C_nH_aF_bCl_cBr_dI_e$ that is a linear alkyl, or $C_mH_fF_gCl_hBr_iI_j$ that includes a cyclic alkyl in the chemical structure thereof, "n" is an integer not smaller than 1, "m" is an integer not smaller than 3, and "a", "b", "c", "d", "e", "f", "g", "h", "i", and "j" are each independently an integer not smaller than 0, and satisfy 2n+1=a+b+c+d+e and 2m−1=f+g+h+i+j).

16. The secondary battery according to claim 15, wherein a mole ratio of the linear carbonate relative to the metal salt in the electrolytic solution is 3 to 5.

17. The secondary battery according to claim 15, wherein the chemical structure of the anion of the metal salt is represented by general formula (1-1) below, $$(R^3X^2)(R^4SO_2)N \qquad \text{general formula (1-1)}$$

($R^3$ and $R^4$ are each independently $C_nH_aF_bCl_cBr_dI_e$ $(CN)_f$ $(SCN)_g$ $(OCN)_h$, "n", "a", "b", "c", "d", "e", "f", "g", and "h" are each independently an integer not smaller than 0, and satisfy $2n+1=a+b+c+d+e+f+g+h$, $R^3$ and $R^4$ optionally bind with each other to form a ring, and in that case, satisfy $2n=a+b+c+d+e+f+g+h$, $X^2$ is selected from $SO_2$, $C=O$, $C=S$, $R^c$ $P=O$, $R^d$ $P=S$, $S=O$, or $Si=O$, $R^c$ and $R^d$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^c$ and $R^d$ each optionally bind with $R^3$ or $R^4$ to form a ring).

18. The secondary battery according to claim 15, wherein the chemical structure of the anion of the metal salt is represented by general formula (1-2) below, $$(R^5SO_2)(R^6SO_2)N \qquad \text{general formula (1-2)}$$

($R^5$ and $R^6$ are each independently $C_nH_aF_bCl_cBr_dI_e$,

"n", "a", "b", "c", "d", and "e" are each independently an integer not smaller than 0, and satisfy $2n+1=a+b+c+d+e$, $R^5$ and $R^6$ optionally bind with each other to form a ring, and, in that case, satisfy $2n=a+b+c+d+e$).

19. The secondary battery according to claim 15, wherein the metal salt is $(CF_3SO_2)_2NLi$, $(FSO_2)_2NLi$, $(C_2F_5SO_2)_2NLi$, $FSO_2(CF_3SO_2)NLi$, $(SO_2\ CF_2\ CF_2\ SO_2)NLi$, or $(SO_2\ CF_2\ CF_2\ CF_2\ SO_2)NLi$.

20. The secondary battery according to claim 15, wherein either the linear alkyl or the cyclic alkyl in $R^{20}$ and $R^{21}$ of the general formula (2) satisfies $a>0$ or $f>0$.

21. The secondary battery according to claim 15, wherein the negative electrode includes a graphite having a BET specific surface area of 0.5 to 15 m²/g as a negative electrode active material.

22. The secondary battery according to claim 15, wherein the negative electrode includes a graphite having a BET specific surface area of 4 to 12 m²/g as a negative electrode active material.

23. The secondary battery according to claim 21, wherein the graphite has a mean particle diameter in a range of 2 to 30 μm.

24. The secondary battery according to claim 15, wherein the secondary battery includes a polymer having a hydrophilic group as a binding agent.

25. A method for producing a secondary battery, the method comprises providing a negative electrode, a positive electrode, and an electrolytic solution, and forming a coating a coating containing S, O, and C on a surface of the negative electrode and/or the positive electrode by performing, on the negative electrode, positive electrode, and the electrolytic solution, an activation process including step (a), step (b), and step (c) below, (a) step of performing charging to a second voltage $V_2$ in step (a-1) or step (a-2) below, (a-1) step of performing charging at a first rate $C_1$ to a first voltage $V_1$, and then performing charging at a second rate $C_2$ to the second voltage $V_2$ where $V_1<V_2$, and $C_1<C_2$, (a-2) step of performing charging at a constant charging rate $C_{a-2}$ of 0.5C or higher to the second voltage $V_2$, (b) step of discharging the secondary battery having been subjected to step (a), at a third rate $C_3$ to a third voltage $V_3$ or lower, and (c) step of performing charging and discharging at a fourth rate $C_4$ between the third voltage $V_3$ and the second voltage $V_2$, the electrolytic solution contains a metal salt whose cation is an alkali metal, an alkaline earth metal, or aluminum and whose anion has a chemical structure represented by general formula (1) below, and a linear carbonate represented by general formula (2) below, the linear carbonate being contained by not less than 90 vol % relative to an entire organic solvent, a mole ratio of the linear carbonate relative to the metal salt being 2 to 6, $$(R^1k)(R^2SO_2)N \qquad \text{general formula (1)}$$

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, R$^1$ and R$^2$ optionally bind with each other to form a ring, X$^1$ is selected from SO$_2$, C=O, C=S, R$^a$ P=O, R$^b$ P=S, S=O, or Si=O, R$^a$ and R$^b$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, R$^a$ and R$^b$ each optionally bind with R$^1$ or R$^2$ to form a ring), R$^{20}$OCOOR$^{21}$ general formula (2)

(R$^{20}$ and R$^{21}$ are each independently selected from C$_n$H$_a$F$_b$Cl$_c$Br$_d$I$_e$ that is a linear alkyl, or C$_m$H$_f$F$_g$Cl$_h$Br$_i$I$_j$ that includes a cyclic alkyl in the chemical structure thereof, "n" is an integer not smaller than 1, "m" is an integer not smaller than 3, and "a", "b", "c", "d", "e", "f", "g", "h", "i", and "j" are each independently an integer not smaller than 0, and satisfy 2n+1=a+b+c+d+e and 2m−1=f+g+h+i+j).

\* \* \* \* \*